US010657486B1

(12) United States Patent
Wolter et al.

(10) Patent No.: US 10,657,486 B1
(45) Date of Patent: May 19, 2020

(54) CONTAINERS FOR CROWDSOURCED DELIVERY

(71) Applicant: DOORDASH, INC., San Francisco, CA (US)

(72) Inventors: Jonathan Andrew Wolter, San Francisco, CA (US); Wiktor Macura, San Francisco, CA (US)

(73) Assignee: DOORDASH, INC., San Francisco, CA (US)

( * ) Notice: Subject to any disclaimer, the term of this patent is extended or adjusted under 35 U.S.C. 154(b) by 568 days.

(21) Appl. No.: 14/811,924

(22) Filed: Jul. 29, 2015

(51) Int. Cl.
*G06Q 10/08* (2012.01)
*B65D 25/04* (2006.01)
*G06Q 50/00* (2012.01)

(52) U.S. Cl.
CPC ......... *G06Q 10/0835* (2013.01); *B65D 25/04* (2013.01); *G06Q 10/0833* (2013.01); *G06Q 50/01* (2013.01)

(58) Field of Classification Search
CPC ........... G06Q 10/0835; G06Q 10/0833; G06Q 50/01; B65D 25/04
See application file for complete search history.

(56) References Cited

U.S. PATENT DOCUMENTS 6,675,153 B1 * 1/2004 Cook .................... G06Q 20/02
705/64
8,275,359 B2 9/2012 Drennan 2009/0266722 A1 * 10/2009 Rogers .................. B65D 33/25
206/216
2011/0320034 A1 * 12/2011 Dearlove ............... G06Q 10/08
700/216
2012/0173448 A1 * 7/2012 Rademaker .......... G06Q 10/083
705/338

(Continued)

FOREIGN PATENT DOCUMENTS

WO       WO 0111523 A1 *  8/2000  ............. G06F 17/60
WO       WO2015164264     * 10/2015  ............. G06Q 50/28

OTHER PUBLICATIONS

Susy d'Hont, The Cutting Edge of RFID Technology and Applications for Manufacturing and Distribution, 2004, p. 9-11 (Year: 2004).*

(Continued)

*Primary Examiner* — Kevin H Flynn
*Assistant Examiner* — Ibrahim N El-Bathy
(74) *Attorney, Agent, or Firm* — Mattingly & Malur, PC

(57) ABSTRACT

In some examples, a smart container may enable crowdsourced delivery of items from a pickup location to a delivery location. The container may include a location sensor and a communication interface to enable the container to provide its location to at least one of a service computing device, a courier device, a sender device, or a recipient device. In some cases, a service provider may employ public transport vehicles to transport the container along a portion of a delivery route. One crowdsourced courier may pick up the container for placement on the public transport vehicle and another crowdsourced courier may pick up the container from the public transport vehicle and deliver the container to the delivery location. Further, the container may include multiple compartments, and recipients who receive a shipment in the container may be solicited to deliver the container to a delivery location of a next recipient.

21 Claims, 9 Drawing Sheets

(56) References Cited

U.S. PATENT DOCUMENTS

| | | |
|---|---|---|
| 2013/0132140 A1 | 5/2013 | Amin et al. |
| 2014/0129951 A1 | 5/2014 | Amin et al. |
| 2014/0149269 A1 | 5/2014 | Kantarjiev et al. |
| 2014/0188750 A1* | 7/2014 | Seiler ............... G06Q 10/08345 705/335 |
| 2014/0279596 A1* | 9/2014 | Waris .................. G06Q 10/083 705/317 |
| 2015/0120602 A1* | 4/2015 | Huffman .............. G06Q 10/083 705/339 |
| 2016/0063435 A1 | 3/2016 | Shah et al. |
| 2016/0071050 A1 | 3/2016 | Kaye |
| 2016/0223345 A1 | 8/2016 | Thakur et al. |
| 2016/0232489 A1* | 8/2016 | Skaaksrud ......... G06Q 10/0833 |
| 2016/0300185 A1* | 10/2016 | Zamer ................ G06Q 10/0834 |
| 2016/0328781 A1 | 11/2016 | Patel-Zellinger et al. |
| 2017/0046644 A1 | 2/2017 | Zhang et al. |
| 2017/0116570 A1 | 4/2017 | Schroeder et al. |
| 2017/0147951 A1 | 5/2017 | Meyer et al. |
| 2018/0025407 A1 | 1/2018 | Zhang et al. |

OTHER PUBLICATIONS

Notice of Allowance dated May 6, 2019, for U.S. Appl. No. 15/078,837, of Liu, X., et al., filed Mar. 23, 2016.
Final Office Action dated May 30, 2019, for U.S. Appl. No. 15/081,113, of Bhorania, J., et al., filed Mar. 25, 2016.
Final Office Action dated Jun. 3, 2019, for U.S. Appl. No. 15/081,066, of Bhorania, J., et al., filed Mar. 25, 2016.
Non-Final Office Action dated Oct. 18, 2018, for U.S. Appl. No. 15/081,066, of Bhorania, J., et al., filed Mar. 25, 2016.
Non-Final Office Action dated Oct. 23, 2018, for U.S. Appl. No. 15/081,113, of Bhorania, J., et al., filed Mar. 25, 2016.
Non-Final Office Action dated Nov. 28, 2018, for U.S. Appl. No. 15/078,837, of Liu, X., et al., filed Mar. 23, 2016.

* cited by examiner

CONTAINERS FOR CROWDSOURCED DELIVERY

BACKGROUND

Deliveries of items from senders to recipients are often performed by shipping services, such as the U.S. Postal Service or other businesses that specialize in receiving packaged items for shipment and delivering the packaged items to the intended recipients. Typically, for shipping an item, a sender will package the item in disposable packaging and either deliver the package to the shipping service, or notify the shipping service that the package is ready to be picked up. Such shipping services usually have a large fleet of vehicles operated by employees that travel throughout a service area to make pickups and deliveries of packages.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
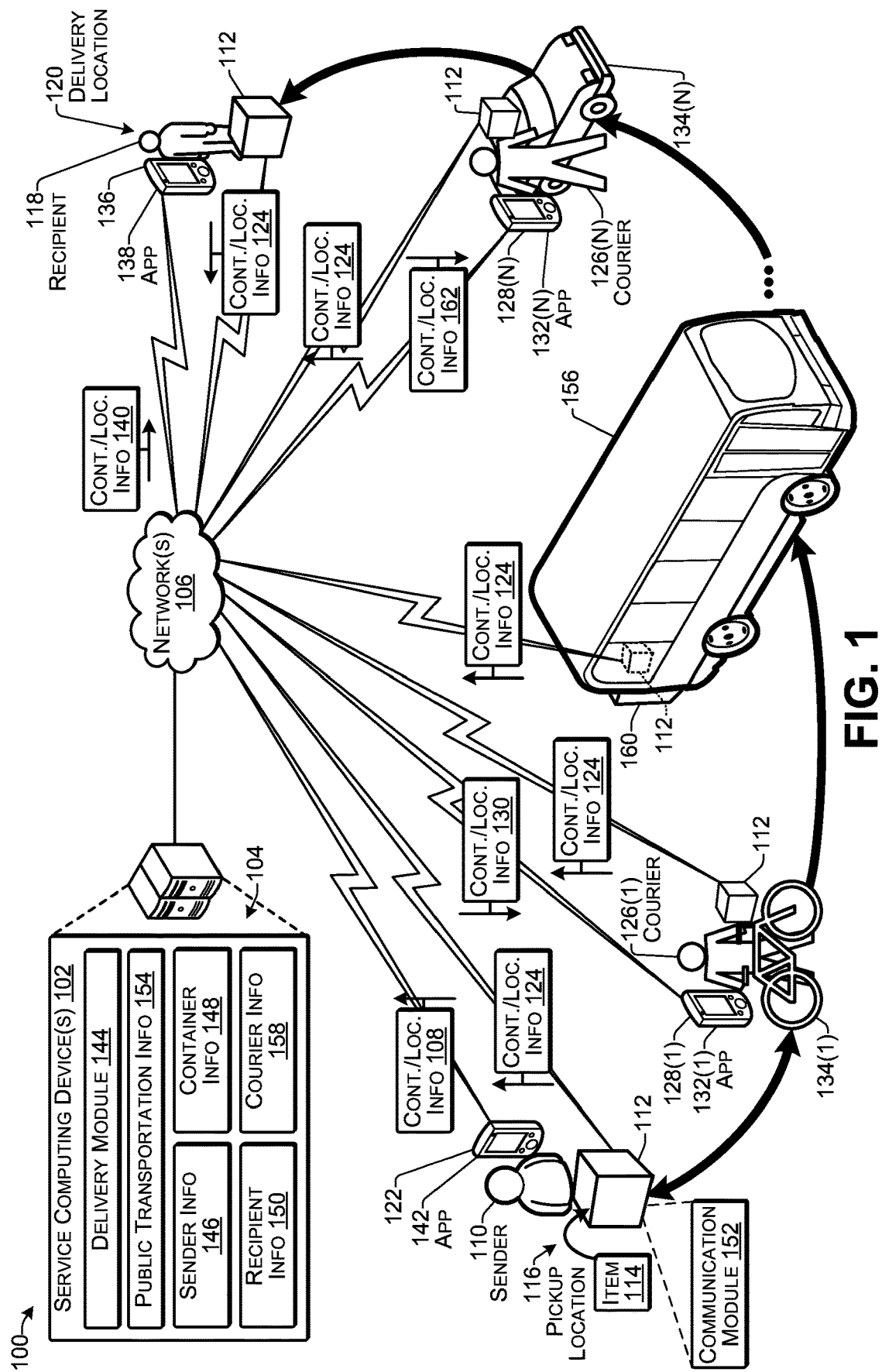
FIG. 1 illustrates an example system that utilizes crowdsourced couriers and a container according to some implementations.

The technology herein provides a novel system that enables people to participate as couriers in a new form of crowdsourced service economy. The disclosed crowdsourcing systems include new types of interactive networks and apparatuses that enable non-abstract and novel innovations for transporting items. For instance, with the technology herein, essentially any person with a mobile device is able to almost immediately become a courier, or cease to be a courier, in a courier network that provides services for delivery of items to recipients. Additionally, through the interaction of a plurality of computing devices, mobile devices, location sensors, and smart containers that make up the system, some examples herein enable delivery of items to recipients through crowdsourced and/or peer-to-peer delivery techniques.

In some examples, a service provider may employ smart containers that enable crowdsourced couriers to deliver items to recipients. Furthermore, the system may utilize public transport vehicles for transporting the containers over at least a portion of a delivery route. For instance, the containers may track their own locations and may communicate location information and/or other information to computing devices associated with the service provider, the couriers, the sender of an item, and/or the intended recipient of the item. In some cases, the containers may also be able to communicate with other containers.

Further, the containers may be low-cost, reusable, tamper resistant, and may be able to be opened remotely, such as through a transmitted signal. Additionally, the containers may emit close range radio signals such as in response to detecting the presence of a courier or the recipient. Further, the containers may include RFID tags, barcodes, and/or may be trackable or identifiable using any of various different techniques. In addition, the containers may be reconfigurable to different interior configurations to enable transport of different types of items, such as by being heated or cooled, insulated, interlockable with other containers, padded for fragile items, etc., and may have different shapes and sizes for containing different types of items. Further, the containers may be shaped or otherwise configured to be transported using particular types of vehicles, such as bicycles, motorcycles, automobiles, buses, trains, etc., and may be mounted on a vehicle rood, placed in a trunk, placed in a custom receptacle on a vehicle, and so forth.

In some examples, the container may have a plurality of separately locked compartments so that a single container may be used to securely transport a plurality of items for a plurality of separate recipients. When the container is delivered to a first recipient, at a first delivery location, a closure of a first compartment in the container may be opened, such as automatically based on location information determined by the container and/or based on detecting the presence of the recipient. As several alternative examples, the compartment of the container may be unlocked by the service provider sending a code over a network, may be unlocked by transmission of a code from a recipient's device or a courier's device to the container, or the compartment may be unlocked by based on manual entry of a code, e.g., by the recipient or the courier entering a code using a keypad on the container.

After the first recipient has retrieved the delivered item from the container, the first recipient or a courier may deliver the container to a second recipient at a second delivery location. For instance, the service provider may request that the first recipient deliver the container to the second delivery location for delivering a second item to the second recipient. In return, the first recipient may receive a discount off the delivery charges paid by the first recipient if the first recipient delivers the container to the second delivery location, such as within a threshold time. Upon delivery of the container to the second recipient, a closure of a second compartment of the container may be opened, e.g., using any of the techniques enumerated above. The container may then be delivered to a third recipient by the second recipient, and so forth, until all the items in the container have been delivered. The last recipient may provide the container to a courier that picks up the container, or the last recipient may take the container to a container return location, such as a receptacle on a public transportation vehicle or a receptacle at another designated location.

Additionally, some implementations herein enable a distributed network of crowdsourced couriers to transport containers containing items to be delivered to recipients. The network allows the containers to flow along traffic streams, such as on public transport vehicles, and be handed off in series to other couriers, while the recipient, the sender, and the service provider are continually able to determine the location and estimated time of arrival of a particular container to a particular delivery location, such as based on communications with the respective courier devices and/or the container. In some cases, the couriers may be semi-trusted couriers able to transport items reliably using containers or other types of containers. Thus, through a series of courier handoffs that may employ scheduled public transport vehicles, an item may be delivered from the sender to the recipient.

Implementations herein are able to utilize regularly scheduled public transportation networks, such as buses, subways, trains, and the like, to create shipping arteries based on underutilized space in public transport vehicles. As one example, a first courier may deliver a container to a public transport vehicle that will then travel a known route. A second courier may retrieve the container from the public transport vehicle, such as at a location near to the delivery location. The second courier may then deliver the container to the recipient at the delivery location. When the container reaches the delivery location, if the delivery is not already prepaid, the recipient provide payment, may accept the delivery with a nearfield communication (NFC) tap of a mobile device, may pay based on communication via BLUETOOTH® low energy (BLE), may transmit payment based on reading a radiofrequency identification (RFID) tag on the container, may pay with an account maintained with the service provider or the sender, may sign for the delivery, or may click "accept" within an application on the recipient's mobile device, or on a webpage or email. As one example, when a container is being used and based on confirmation of payment and/or confirmation of the presence of the recipient, the container may be automatically unlocked, such as by the service provider sending a communication to the container, e.g., by cellular communication, to cause the container to open, or by any of the other techniques discussed above.

In the examples herein, an item may include any tangible good that may be placed into a container for transport. A sender may include any person, business, or other entity that sends an item for delivery to a recipient. In addition, a recipient may include any person, business, or other entity that receives delivery of an item or that has the potential to receive delivery of an item. A courier may be an individual that transports a container, an item, and/or a container containing an item. The service provider may provide payments to the couriers for transporting items and/or containers, and may receive payments from the senders and/or the recipients for delivery services.

For discussion purposes, some example implementations are described in the environment of a crowdsourced courier network and system for delivering items to recipients. However, implementations herein are not limited to the particular examples provided, and may be extended to other service environments, other system architectures, other types of container apparatuses and configurations, and so forth, as will be apparent to those of skill in the art in light of the disclosure herein.

FIG. 1 illustrates an example system 100 for crowdsourced deliveries using a container according to some implementations. The system 100 includes one or more service computing devices 102 of a service provider 104 that may receive, over one or more networks 106, container and/or location information 108 from a sender 110. The container/location information 108 may include identifying information about a container 112, a current location of the container, and/or other information about the container, such as information about an item 114 to be transported in the container 112. For instance, the sender 110 may be using the container 112 to send the item 114 from a pickup location 116 to a recipient 118 at a delivery location 120. In some cases, the sender 110 may use a sender device 122 to send the container/location information 108 to the service computing device 102. Receipt of the container/location information 108 may indicate to the service provider 104 that the container 112 is ready for pickup at the pickup location 116.

Additionally, or as an alternative to using the sender device 122, in some examples, the sender 110 may cause the container 112 to send container information and/or location information 124 to the service computing device 102. As still another alternative, the sender device 122 may be paired with the container 112 for close range radio communication, such as via BLUETOOTH® communication. The sender device 122 and the container 112 may exchange information through direct communication and at least one of the sender device or the container may send the container/location information 108 or 124, respectively, to the service computing device 102.

As one example, the recipient 118 may have ordered the item 114 from the sender 110 or from an entity associated with the sender 110. In some instances, the recipient 118 may have already paid for the item 114 such as through an electronic commerce transaction, an account with the sender, an account with the service provider 104, or the like. In addition, in some cases, the recipient 118 may have paid the sender 110 for delivery of the item 114 at the time of making payment for the item 114. In such a situation, the sender 110 may pay the service provider 104 for delivering the item 114 to the recipient 118 at the delivery location 120. Alternatively, in other situations, the recipient 118 may pay the service provider 104 directly for delivery of the item 114 to the delivery location 120. As one example, the recipient 118 may have paid the service provider 104 for the item 114 and for delivery of the item 114, and the service provider 104 may credit an account of the sender 110 with the payment for the item 114. Numerous other variations will be apparent to those of skill in the art having the benefit of the disclosure herein.

In the example of FIG. 1, the sender 110 may use the container 112 to send the item 114 to the delivery location 120. The container 112 may be configured to communicate over the one or more networks 106 with the service computing device 102. For instance, as discussed additionally below with respect to FIG. 2, the container 112 may include features such as a microprocessor, a communication interface, a location sensor, tamper sensors, and a remotely operable lock. Thus, the container 112 may periodically send container/location information 124 to at least the service computing device 102. In some examples, the service computing device 102 may disseminate this location information to the sender 110, to the recipient 118, and/or to one or more couriers 126 who transport the container 112, with the item 114 locked inside, to the delivery location 120. Additionally, in some examples, the container 112 may communicate over the one or more networks 106 or through direct wireless communication with at least one of the sender 110, the recipient 118, and/or the couriers 126, such as for sending location information and/or for confirming identification of the container.

Upon receipt of an indication that the container 112 with the item 114 inside is ready to be picked up at the pickup location 116, the service computing device 102 may determine a delivery route to the delivery location 120. For instance, the service computing device 102 may determine one or more public transportation routes that may be used for delivering the container 112, and the service computing device 102 may also select a courier 126 to pick up the container 112. As one example, the selected courier 126 may be selected based at least in part on being within a threshold travel time of the pickup location 116. As another example, the selected courier 126 may be selected based on other parameters, such as based on a round-robin selection of available couriers within a threshold travel time of the pickup location 116, or any other suitable courier selection technique.

A respective courier location of each respective courier 126(1)-126(N) may be determined from a GPS receiver or other suitable location sensors associated with a respective courier device 128(1)-128(N) associated with each respective courier 126(1)-126(N). A first courier 126(1) whose courier location 120 is within the threshold travel time of the sender's pickup location 116 may be selected to pick up the container 112. As one example, the service computing device 102 may send container information and/or location information 130 to the courier device 128(1) of the selected courier 126(1).

Each courier device 128(1)-128(N) may execute a respective instance of a courier application 132(1)-132(N). For example, the couriers 126 may use respective courier devices 128, such as smart phones, tablet computers, wearable computing devices, laptops, or the like, and these courier devices 128 may have installed thereon the courier application 132. The courier application 132 may be configured to receive the container/location information 130 from the service computing device 102 or directly from the container 112, and may provide a selected courier 126 with information for picking up and handing off a particular container 112 for transporting the container 112 along one leg of the determined delivery route. Accordingly, a series of handoffs may be made for delivering the container 112 and the item 114 to the recipient 118 at the delivery location 120. The courier application 132 may further enable the courier 126 to communicate to the service computing device 102 acceptance of an assigned container transport job and to subsequently provide an indication of completion of the transport job when the handoff of the container 112 has been made.

Additionally, the courier application 132 may provide the service computing device 102 with an indication of a current location of a particular courier device 128. For instance, one or more location sensors associated with each courier device 128, such as a GPS receiver (not shown in FIG. 1) may provide current location information to the courier application 132. Based on this location information, the courier application 132 may send location information to the service computing device 102, such as on a periodic basis or using any other suitable technique. Accordingly, the service computing device 102 may receive an indication of a geographic location of each courier device 128 of each active courier 126.

In some cases, a subset of courier devices 128 associated with active couriers may communicate with the service computing device 102, and may send location information obtained from the one or more location sensors associated with each courier device 128. Further, another subset of courier devices 128 associated with inactive couriers may be periodically pinged by the service computing device 102 to determine interest in becoming active and, if so, requesting current location information of the associated inactive courier. Inactive couriers who are interested in being activated may allow their courier devices 128 to respond with their location information, while those who are not interested in being activated may keep their location information private by not responding. In some examples, the courier application 132, the service computing device 102, the sender device 122, and/or the container 112 may communicate with each other based on one or more APIs (application programming interfaces) over the one or more networks 106. Alternatively, in other examples, the courier device 128 may receive the container/location information 130 over the one or more networks 106 by other techniques, such as via an SMS text message, a voicemail, a telephone call, or other types of electronic communications.

A first courier 126(1) whose courier location 120 is within the threshold travel time of the sender's pickup location 116 may be selected to pick up the container 112. The service computing device 102 may send the container/location information 130 to the courier device 128(1) of the selected courier 126(1). In response, the selected courier 126(1) may respond by acknowledging receipt of the container/location information 130 and by proceeding to the pickup location 116 specified in the container/location information 130. For example, the container/location information 130 may include at least the GPS coordinates (e.g., longitude and latitude) or an address of the pickup location 116 as well as instructions for transporting the container 112 to a handoff location. The container/location information 130 may also include identifying information about the container 112, such as a container identifier (ID), container contact information, such as for directly communicating with the container 112, or the like, as well as item information, recipient information, and/or sender information in some cases.

As another example, the container/location information 130 sent to the selected courier 126(1) may include the container contact information. The selected courier 126(1) may determine the current location of the container 112 by using the container contact information to communicate directly with the container 112 through the one or more networks 106. For instance, the container 112 may use an onboard GPS receiver (not shown in FIG. 1) to determine its own location, and may send this location information to the courier device 128(1) of the selected courier 126(1), such as in response to a communication from the selected courier 126(1) or a communication from the service computing device 102. As an example, the service computing device 102 may send courier contact information of the selected courier 126(1) to the container 112, and in response, the container 112 may send the container/location information 130 to the selected courier 126(1).

Further, at least some of the couriers 126(1)-126(N) may use vehicles 134(1)-134(N) when transporting containers. Examples of vehicles 134 may include bicycles, scooters, motorcycles, automobiles, trucks, skateboards, and so forth. In some cases, the type of vehicle 134 associated with a particular courier 126 may be taken into consideration when determining travel times for particular couriers 126.

In addition, the recipient 118 may be associated with a recipient device 136 that may execute a recipient application 138. For example, the recipient 118 may use the recipient device 136, such as a smart phone, tablet computer, wearable computing device, laptop, desktop, or the like, and the recipient device 136 may have installed thereon the recipient application 138. The recipient application 138 may enable the recipient 118 to track the location of the container 112 containing the item 114 to be delivered to the recipient 118. For example, the recipient application 138 may present one or more graphic user interfaces (GUIs) on a display of the recipient device 136 for enabling the recipient 118 to view a current location of the container 112. In some examples, the recipient application 138 may receive container/location information 140 directly from the container 112. In other examples, the service computing device 102 may receive container/location information from the container 112 or from a courier 126 in possession of the container 112, and may send the container/location information 140 to the recipient application 138.

Additionally, in some examples, the recipient application 138 may enable the recipient 118 to make a payment for the item 114 and/or for delivery of the item 114 using the recipient application 138. For instance, the service provider 104 may charge a recipient account associated with the recipient 118 for an amount corresponding to the item 114 and/or for delivery of the item 114. In some examples, the recipient application 138, the container 112, the courier application 132, and/or the service computing device 102 may communicate with each other via one or more APIs. Additionally, or alternatively, the recipient application 138 may include a web browser, or the like, and the recipient 118 may navigate to a website associated with the service provider 104. In this case, the recipient 118 may use the website associated with the service provider 104 to view the current location of the container 112, and the website may provide at least some of the functionality attributed to the recipient application 138 herein.

The sender device 122 may include a sender application 142. For example, the sender device 122 may be a smart phone, tablet computer, wearable computing device, laptop, desktop, or other suitable computing device, and the sender application 142 may enable the sender device 122 to communicate with the service computing device 102, the container 112, the recipient device 136, and or the courier devices 128 of selected couriers, such as based on one or more APIs or by other types of electronic communications. Thus, the sender 110 may user the sender application 142 to determine the current location of the container 112, a condition of the container 112, and the like.

The one or more networks 106 can include any appropriate network, including a wide area network, such as the Internet; a local area network, such an intranet; a wireless network, such as a cellular network; a local wireless network, such as Wi-Fi; close-range wireless communications, such as BLUETOOTH® and BLUETOOTH® low energy; a wired network, including fiber optics and Ethernet; any combination thereof, or any other suitable communication network. Components used for such communication technologies can depend at least in part upon the type of network, the environment selected, or both. Protocols for communicating over such networks are well known and will not be discussed herein in detail. Accordingly, the service computing device 102, the container 112, the recipient device 136, the sender device 122, and the courier devices 128 are able to communicate over the one or more networks 106 using wired or wireless connections, and combinations thereof.

In the illustrated example, the service computing device 102 includes a delivery module 144 that may be executed by the service computing device 102 to provide, at least in part, the delivery service functionality attributed to the service computing device 102. The delivery module 144 may receive the container/location information 108 from the sender 110 and/or the container/location information 124 from the container 112, and may associate the received information with sender information 146 and container information 148 that is maintained by the service computing device 102. For instance, based on sender identifying information that may be included with the container/location information 108 and/or the container/location information 124, such as a sender account identifier, a sender name, sender address, or the like, the delivery module 144 may associate a particular delivery job with a particular sender account in the sender information 146 and with a particular container associated with container information 148. For instance, the sender information 146 may include information about a sender account, the sender's pickup location 116, the type of item 114 being sent, the recipient information, time and date information, and the like. Furthermore, the container information 148 may include container ID information, container contact information for directly communicating with the particular container, a container type or configuration, a container history, a container lock code for remotely initiating unlocking and/or opening of a closure of a compartment of the container, and so forth.

The delivery module 144 may further create and/or access recipient information 150 based on the received container/location information 108 and/or the container/location information 124. For instance, the recipient information 150 may include the name and/or delivery address of the recipient 118. In the case that the recipient device 136 has the recipient application 138 associated with the service provider 104 installed thereon, the recipient information and/or the delivery job may be matched to a recipient account in the recipient information 150. In some examples, the item 114 may already be correlated with a recipient account maintained by the service computing device 102, such as in the case that the recipient 118 placed an order for the item 114 using a service provided by the service provider 104.

In other examples, the delivery module 144 may match the delivery job with a recipient device 136 and/or recipient account based on the delivery location 120 and/or other recipient identifying information. Matching of a particular recipient device 136 or particular recipient account to a particular delivery job may be the basis for the delivery module 144 to enable direct communication between the container 112 and the recipient device 136. For example, a communication module 152 executed by the container 112 may communicate with the recipient application 138 via one or more APIs, or by other suitable techniques, such as SMS messaging, instant messaging, or the like. The delivery module 144 may send recipient identifying information to the container 112 to allow the container 112 to communicate with the recipient device 136. Additionally, or alternatively, the delivery module 144 may send container identifying information to the recipient device 136 to enable the recipient device 136 to communicate with the container 112.

In some examples, the container/location information 108 received from the sender 110 may indicate the recipient delivery location 120. In other examples, the container/location information 108 received from the sender 110 may merely indicate an identity of the recipient 118, such as by associating the delivery job with a recipient account in the recipient information 150. For instance, suppose that the item 114 is to be delivered to the recipient 118 at a current location rather than at a fixed address. Accordingly, upon receipt of the container/location information 108 and/or the container/location information 124, the delivery module 144 may communicate with the recipient application 138 to determine the delivery location 120. For example, the recipient application 138 may determine the delivery location 120 from a GPS receiver associated with the recipient device 136. The recipient application 138 may use this location information as the delivery location 116 for delivery of the item 114. In other examples, the recipient 118 may manually enter an address into a GUI provided by the recipient application 138 that may be used as the delivery location 116.

In the case that the delivery location 120 is close to the pickup location 116 (e.g., 5-10 minutes courier travel time) the courier 126 assigned to pick up the container 112 might also deliver the container 112 to the delivery location 120. However, in the case the delivery location 120 is a greater distance and/or travel time from the pickup location 116, the delivery module 144 may refer to public transportation information 154 when determining a delivery route from the pickup location 116 to the delivery location 120. For instance, the public transportation information 154 may include a plurality of different scheduled routes traveled by various different public transport vehicles 156, such as busses, trains, shuttles, subways, streetcars, ferries, and the like. The service computing device 102 may maintain or may access one or more databases, web servers, or other sources of information for obtaining and periodically updating the public transportation information 154. Accordingly, based at least in part on the public transportation information 154, the delivery module 144 may determine a delivery route that includes one or more public transport vehicle routes for transporting the container 112 across a geographic region to a location near to the delivery location 120.

After determining one or more public transport vehicles 156 that may be used for transporting the container 112 along the delivery route, the delivery module 144 may refer to courier information 158 when selecting a particular courier to pick up the container 112 from the pickup location 116 and hand off the container 112 to a selected public transport vehicle 156. For example, the courier information 158 may include the current indicated geographic location of each active courier 126, such as in the geographic region between the pickup location 116 and the delivery location 120. Accordingly, the delivery module 144 may select a first courier 126(1) to pick up the container 112 from the pickup location 116. The delivery module 144 may further instruct the first courier 126(1) to hand off the container 112 to the public transport vehicle 156, such as by placing the container 112 into a receptacle 160 on or in the public transport vehicle 156, or otherwise placing the container on the public transport vehicle. The public transport vehicle 156 may travel along the scheduled route and may reach a location near to the delivery location 120.

In some examples, multiple public transport vehicles 156 may be used for transporting the container 112 along the route to the delivery location. For instance, a second courier 126 (not shown in FIG. 1 for clarity) may be contacted by the delivery module 144 to remove the container 112 from the receptacle 160 on a first public transport vehicle 156 and place the container 112 into another receptacle 160 on a second public transport vehicle 156 (not shown in FIG. 1 for clarity). This process may be repeated a number of times until the container 112 is near to the delivery location 120 of the recipient 118. Based on the transportation information 154, and further based on the container/location information 124 received from the container 112, the delivery module 144 can provide instructions to a courier 126 as to when vehicle carrying a particular container 112 will arrive at a location of a courier, and when the next public transport vehicle 156 will be arriving for the next handoff. For example, if there are a large number of public transport vehicles 156 traveling throughout a geographic region, and if most of these public transport vehicles 156 have one or more containers 112 on board on their way to various delivery locations, then the delivery module 144 will know the locations of these public transport vehicles 156 based on receiving container/location information 124 from the many containers 112, and will be able to accurately predict arrival times of the public transport vehicles at various destinations.

An Nth courier 126(N) may be selected by the delivery module 144 to remove the container 112 from the receptacle 160 on whichever public transport vehicle 156 the container 112 is currently located, and deliver the container 112 the rest of the way to the delivery location 120. For example, the delivery module 144 may send container and/or location information 162 to the courier device 128(N) of the selected Nth courier 126(N) to inform the selected courier 126(N) where to pick up the container 112, and to further provide the delivery location 122 which to deliver the container 112. As mentioned above, in some examples, the service computing device 102 may provide the Nth courier with contact information for contacting the container 112 directly, and the container 112 may send to the Nth courier 126(N) the current location of the container 112.

While the container 112 is traveling along the selected route for delivery, the container 112 may periodically send container/location information 124 over the network 106 to at least one of the service computing device 102, the courier devices 128 of the selected couriers 126(1)-126(N), the sender device 122, or the recipient device 136. Accordingly, the location of the container 112 may be determined at essentially any point in time during transportation of the container 112 from the pickup location 116 to the delivery location 120. Further, the container 112 may also respond to inquiries as to location, as well as status of an item inside the container 112, such as interior temperature, whether the closure of the container has been opened, and so forth.

After the Nth courier 126(N) retrieves the container 112 from the receptacle 160 on the public transport vehicle 156, the Nth courier may travel to the delivery location 120 to deliver the container 112. In some examples, the empty container 112 may be taken by the Nth courier 126(N) at the completion of delivery and returned to a central repository or other receptacle. For instance, the courier 126(N) may place the empty container 112 back onto a public transport vehicle 156, and the empty container 112 may be subsequently retrieved from the public transport vehicle 156 by another courier 126 for reuse. In other examples, such as in the case in which the courier 126(N) leaves the container 112 at the door of a recipient 118 who is not currently at the delivery location 120, the empty container 112 may be picked up later by a courier 126, or the recipient 118 may reuse the empty container 112 to send a different item to a different recipient. As another alternative, a courier 126 on his or her way to pick up an item from a sender may be directed by the delivery module 144 to one or more containers 112 that are currently available for pickup from locations of previous recipients. Furthermore, the courier 126 may be directed to pick up a particular type or configuration of container based on the type of item that is to be sent by the sender to which the courier 126 is going.

As one example, if the recipient 118 is not at the delivery location 120 when the courier 126(N) arrives with the container 112, the courier 126(N) may leave the container 112 at the delivery location 120. Subsequently, when the recipient 118 arrives at the delivery location 120, the recipient 118 may open the container 112 using any of various techniques. In some cases, when the container 112 determines it is at the delivery location 120, such as by location information received from an onboard GPS receiver, the container 112 may send container/location information 124 to the service computing device 102, the sender device 122, and/or the recipient device 136. When the recipient 118 arrives at the delivery location 120, the recipient 118 may establish contact with the container 112 such as by pairing through a close range radio communication, by NFC communication, or the like. In some examples, the application 138 on the recipient device 136 may communicate with the communication module 152 on the container 112 to confirm the identity of the recipient 118 and to thereby cause the container 112 to open the closure of the container 112.

As another example, the recipient device 136 may communicate with the service computing device 102. Based on verification by the delivery module 144 of a communication received from the recipient device 136, the delivery module 144 may send a signal or other information to the container 112 to cause the container 112 to unlock or otherwise open the closure of the compartment in the container 112. In some examples, the sending of the information to unlock the container may be based upon both receiving the location information 124 from the container 112 and receiving confirmation and/or recipient identification information from the recipient device 136.

As another example, the container 112 may communicate directly with the application 138 on the recipient device 136 for confirming the identity of the recipient 118. Accordingly, based on detecting the presence of the designated recipient 118 within a threshold proximity to the container 112, the container 112 may unlock or otherwise open the closure to the container 112. As several alternative examples, the closure of the container 112 may be unlocked by the delivery module 144 sending a code over the one or more networks 102 to the recipient device 118, and the container 112 then may be unlocked by transmission of the code from the recipient's device 136 to the container 112. Alternatively, if the recipient is home when the courier 126(N) arrives, the code may be sent to the courier device 128(N), which may communicated with the container 112 to unlock the closure. As still another example, the closure of the container 112 may be unlocked by based on manual entry of a code, e.g., by the recipient 118 or the courier 126(N) entering a code using a keypad (not shown in FIG. 1) on the container 112. For instance, the delivery module 144 may send a communication to the recipient device 136 or to the courier device 128(N), such as to provide a code or the like that the recipient 118 or courier 126(N) may enter into a keypad on the container 112. As another example, the service provider may send a communication to the recipient device 136 or to the courier device 128(N), such as to provide a code or the like that the recipient device 136 or the courier device 128(N) may transmit by radio signal to the container 112 to cause the container to unlatch a closure.

As still another example, the recipient 118 may be required to complete payment for the item 114 and for delivery of the item 114 prior to the closure of the container 112 being opened. Thus, in some examples, based at least in part on confirmation of payment and/or confirmation of the presence of the recipient 118, the container 112 may be automatically unlocked, such as by the delivery module 144 sending a communication to the container 112, e.g., by cellular communication, to cause the container 112 to open following receipt of payment, or by any of the other techniques discussed above.

As still another example, if the recipient 118 is at the delivery location 120 when the courier 126(N) arrives with the container 112, the courier 126(N) or the recipient 118 may open the closure of the container 112 to retrieve the item 114 from the container 112. The recipient 118 or the courier 126(N) may use one or more of the techniques discussed above. The courier 126(N) may take the container 112 with him or her following the delivery. Alternatively, the recipient 118 may reuse the container 112 for sending a different item, returning the original item 114, or the like. Furthermore, numerous other variations will be apparent to those of skill in the art having the benefit of the disclosure herein, with the foregoing being merely several examples for discussion purposes.

Figure 2:
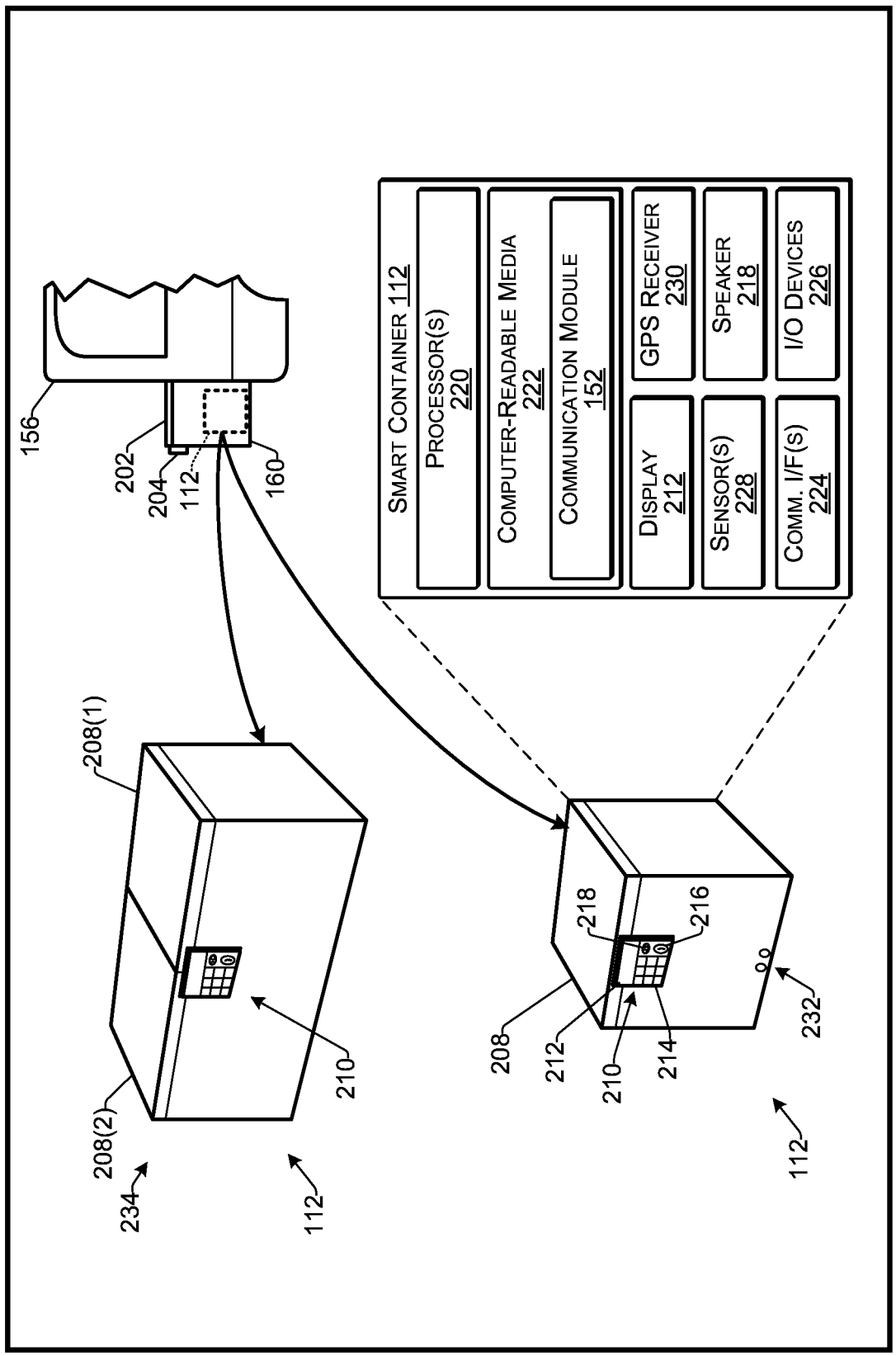
FIG. 2 illustrates example containers and a vehicle receptacle according to some implementations.

FIG. 2 illustrates example smart containers and a vehicle receptacle according to some implementations. In this example, the vehicle receptacle 160 is mounted on the exterior of the public transport vehicle 156, such as on the rear of the public transport vehicle. In other examples, the receptacle 160 may be mounted inside the public transport vehicle 156, under the public transport vehicle 156, or in any other suitable location. In other examples, the receptacle may be a seat, or a courier who is riding on the public transport vehicle 156. In the illustrated example, the receptacle 160 may include a lid or other closure 202 for enclosing the container 112 inside the receptacle 160.

In some examples, the closure 202 may be locked or otherwise latched by a latching mechanism 204, such as to prevent theft of the container 112 or other unauthorized access to the interior of the receptacle 160. For instance, the latching mechanism 204 may require the courier to manually enter a code. Additionally, or alternatively, the latching mechanism 204 may open by an NFC (near field communication) or other wireless signal from the courier device of a courier selected or otherwise authorized by the service provider 104 to retrieve a container 112 from within the receptacle 160. In some cases, the latching mechanism 204 may be similar to the security mechanism discussed for the container 112 below.

The container 112 includes a closure 208 that may be locked or otherwise latched by a security mechanism 210 to prevent unauthorized access to a compartment inside the container 112. The security mechanism 210 includes a display 212, a keypad 214, a keyhole 216, and a speaker 218. Further, the container 112 may include one or more processors 220, one or more computer-readable media 222, one or more communication interfaces 224, one or more I/O devices 226, one or more sensors 228, and a GPS receiver 230. The keyhole 216 may be used to manually open the container 112 in a situation in which the container closure 208 is stuck in the latched position, or the like. For example, a key may be kept by the service provider 104.

The processor 220 may be implemented as one or more microprocessors, microcontrollers, digital signal processors, logic circuits, and/or other device that manipulates signals based on operational instructions. The processor 220 may be configured to fetch and execute computer-readable processor-executable instructions stored in the computer-readable media 222. The computer-readable media 222 may be a tangible non-transitory computer storage media and may include volatile and nonvolatile memory and/or removable and non-removable media implemented in any type of technology for storage of information such as computer-readable processor-executable instructions, data structures, program modules, or other data. Further, when mentioned herein, non-transitory computer-readable media exclude media such as energy, carrier signals, electromagnetic waves, and signals per se.

The computer-readable media 222 may maintain one or more functional components that are executable by the processor 220. In some implementations, these functional components comprise instructions or programs that are executable by the processor 220 and that, when executed, implement operational logic for performing the actions attributed above to the container 112. Functional components of the container 112 stored in the computer-readable media 222 may include the communication module 152, as discussed above, which may communicate container/location information to at least one of the service computing device, the sender device, the courier devices, or the recipient device, as well as performing other functions, as discussed in some examples herein.

The communication interface(s) 224 may include one or more interfaces and hardware components for enabling communication with various other devices, such as over the one or more networks 106 or directly. For example, the communication interface(s) 224 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, NFC, and the like, as additionally enumerated elsewhere herein.

FIG. 2 further illustrates that the container 112 may include the display 212, which may be any suitable type of electronic display device for visually presenting information. Alternatively, in some examples, the container 112 may not include the display 212. In some cases, the display may provide a visual indication to a courier that is within eyesight of the container to indicate notification to the courier which container the courier has been selected to retrieve. Similarly, the speaker 218 may emit an audible notification to the courier to assist the courier in retrieving a particular container 112 from among multiple containers 112 that might be in the receptacle 160.

The container 112 may further include the one or more I/O devices 226. The I/O devices 226 may include the keypad 214, as well as various other user controls or buttons. Other components included in the container 112 may include the GPS receiver 230 and various other sensors 228, which may include an accelerometer, gyroscope, compass, proximity sensor, an interior temperature sensor, and the like. In some cases, the GPS receiver 230 may be used by the communication module 152 to determine a current geographic location of the container 112. Additionally, or alternatively, the communication interfaces 224 may be used to determine the current location of the container 112, such as based on communication with nearby cell towers, wireless access points, and the like. In some examples, the communication module 152 may send this location information periodically to the service computing device as an indicated location of the container 112.

In addition, the sensors 228 may include tamper detection sensors, which may detect unauthorized opening of the closure 208, and which may cause the container 112 to send a communication to at least one of the service computing device, the courier devices of the selected couriers, the sender device, or the recipient device. The accelerometer may indicate if the container 112 experiences a drop or other impact larger than a threshold amount. Additionally, the temperature sensor may monitor an interior temperature of the container 112 such as for determining if a perishable item is getting too hot or too cold. Furthermore, the container 112 may include various other components that are not shown, examples of which include a power source, such as a battery and power control unit.

The container 112 may be collapsible to a smaller or flat form, such as by folding or deflating. Alternatively, the container 112 may be shaped, such as by being tapered externally, to be able to be inserted or nested into other containers 112 so that a plurality of the containers 112 may be nested into a compact stack for easier transport, such as by a courier. Further, each container 112 may have electrical contacts 232 that are electrically connected to electrical contacts on the other containers 112 when a plurality of the containers 112 are nested. In this manner, the plurality of containers 112 can be electrically connected to each other to enable electrical recharging of a stack of the containers 112 by connecting a power source to a single container 112 in the stack. For instance, the pair of electrical contacts 232 on the outside of the container 112 may align with a pair of electrical contacts on the inside of another container 112 (not shown in FIG. 2).

The containers 112 may be constructed of a durable long-lived material to enable the containers 112 to be used for a large number of delivery cycles. Consequently, use of the containers 112 herein may substantially reduce the use of disposable packaging materials. In some cases, each container 112 may have a history associated therewith that may be read by the service provider, a courier, the recipient, and/or the sender to view the previous places that the container 112 has been used, while still protecting anonymity and privacy of the past recipients.

In addition, in some examples, as indicated at 234, the container 112 may include multiple separately lockable compartments so that a single container 112 may be used to securely transport a plurality of separate items for a plurality of separate recipients. Thus, as indicated at 234, in some instances, the container 112 may include a first closure 208(1) and a second closure 208(2), with the security mechanism 210 being configured to control latching of both closures 208(1) and 208(2). Additionally, while two separate compartments are shown in this example, in other examples, a larger number of separate compartments may be configured in a container 112.

When the container 112 is delivered to a first recipient, at a first delivery location, the closure 208(1) of the first compartment of the container 112 may be opened, such as automatically based on location information determined by the container 112 and/or based on detecting the presence of the first recipient, using any of the techniques discussed above. Subsequently, the container 112 may be delivered to a second delivery location associated with a second recipient. When the container 112 is delivered to the second recipient, at the second delivery location, the closure 208(2) of the second compartment of the container 112 may be opened, such as automatically based on location information determined by the container 112 and/or based on detecting the presence of the second recipient, using any of the techniques discussed above.

Figure 3:
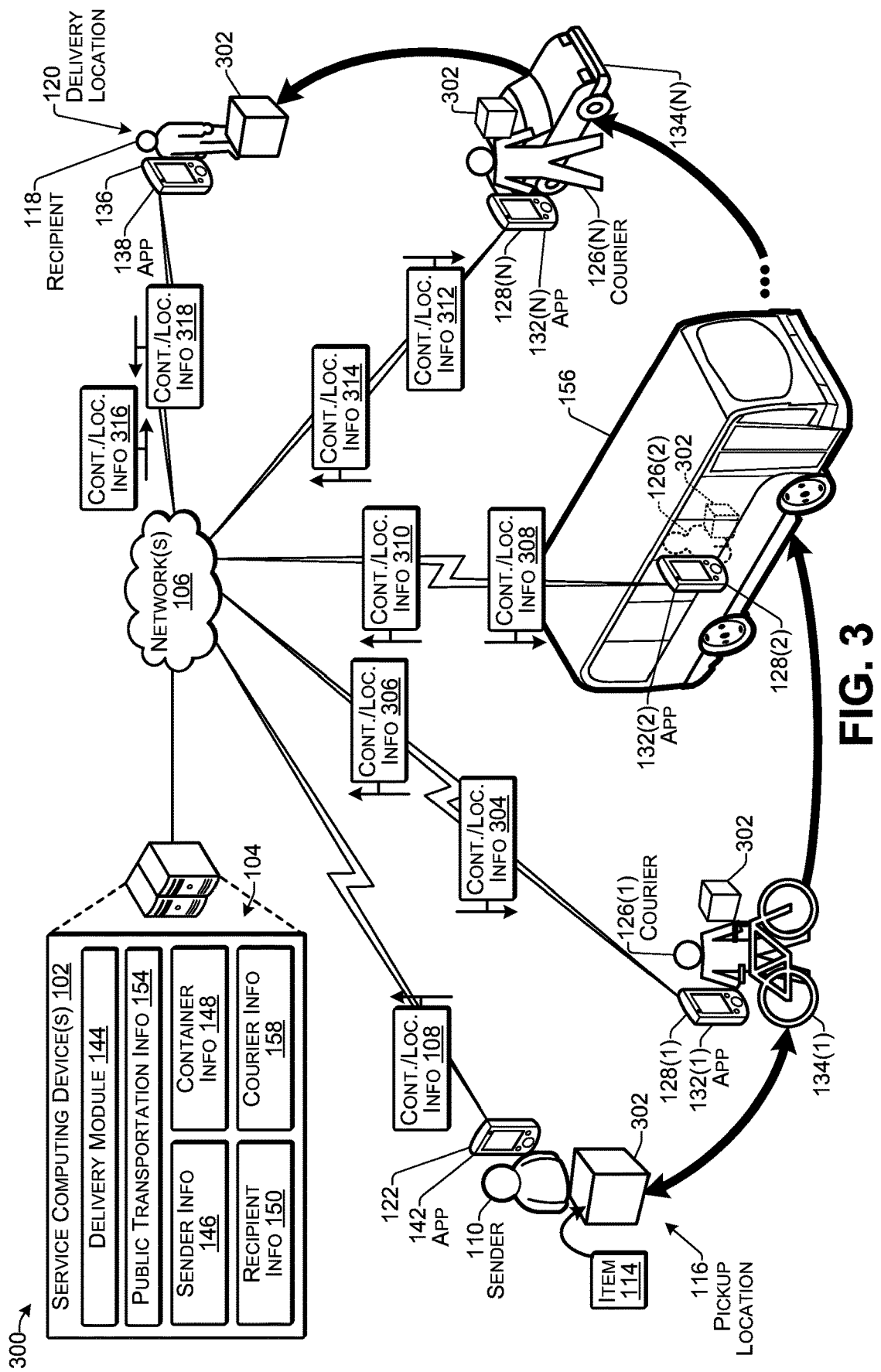
FIG. 3 illustrates an example system enabling deliveries using crowdsourced couriers according to some implementations.

FIG. 3 illustrates an example system 300 enabling deliveries using crowdsourced couriers according to some implementations. In this example, rather than using the container 112, described above, a container 302 may be used that may be a disposable container or a reusable container. The sender 110 may send the container/location information 108 to the delivery module 144 to indicate that the container 302 is ready to be picked up at the pickup location 116. The container/location information 108 received from the sender 110 may further indicate the recipient delivery location 120, such as a recipient address. In other examples, the container/location information 108 received from the sender 110 may merely indicate an identity of the recipient 118, such as by associating the delivery job with a recipient account in the recipient information 150. For instance, in some examples, the item 114 inside the container 302 may be delivered to the recipient 118 at a current location of the recipient 118, rather than at a fixed address.

Based on the container/location information 108 received from the sender, the delivery module 144 may select a first courier 126 to pick up the container 302 from the pickup location 116. The delivery module 144 may send container/location information 304 to the courier device 128(1) of the selected courier 126(1). After the first courier 126 picks up the container 302 from the pickup location 116, the courier device 128(1) may periodically send container/location information 306 to the delivery module 144 to keep the delivery module 144 apprised of the current location of the container 302.

In the case that the delivery location 120 is close to the pickup location 116 (e.g., 5-10 minutes courier travel time) the courier 126(1) assigned to pick up the container 302 might also deliver the container 302 to the delivery location 120. However, in the case the delivery location 120 is a greater distance from the pickup location 116, the delivery module 144 may refer to the public transportation information 154 when determining a delivery route from the pickup location 116 to the delivery location 120. For instance, the delivery module 144 may determine a delivery route that includes one or more public transport vehicle routes for transporting the container 302 across a geographic region to a location near to the delivery location 120.

After determining one or more public transport vehicles 156 that may be used for transporting the container 302 along the delivery route, the delivery module 144 may refer to courier information 158 when selecting the first courier 126(1) to pick up the container 302 from the pickup location 116 and hand off the container 302 to a selected public transport vehicle 156. For example, the courier information 158 may include the current indicated geographic location of each active courier 126, such as in the geographic region between the pickup location 116 and the delivery location 120. Accordingly, the delivery module 144 may instruct the first courier 126(1) to hand off the container 302 to the public transport vehicle 156, such as by handing off the container 302 to another courier 126(2) who is riding on the public transport vehicle 156. For example, the delivery module 144 may send container/location information 308 to the courier device 128(2) of the second courier 126(2) to inform the second courier 126(2) that the container 302 will be handed off to the second courier 126(2) on the public transport vehicle 156.

After the second courier 126(2) has received the container 302 from the first courier 126(1), the courier application 132(2) on the courier device 128(2) of the second courier 126(2) may periodically send container/location information 310 to the delivery module 144 to keep the delivery module 144 apprised of the current location of the container 302. Alternatively, in other examples, the first courier 126(1) may place the container 302 into a receptacle 160 on or in the public transport vehicle 156, as discussed above with respect to FIG. 1. For example, the receptacle 160 may be configured with a GPS receiver and a communication interface (not shown in FIG. 3) to be able to send container location information to the delivery module 144.

The public transport vehicle 156 may travel along the scheduled route and may reach a location near to the delivery location 120. In some examples, multiple public transport vehicles 156 may be used for transporting the container 302 along the route to the delivery location. For instance, the second courier 126(2) may be instructed to handoff the container 302 to another courier 126 on another public transport vehicle 156 and/or place the container 302 into another receptacle 160 on another public transport vehicle 156 (not shown in FIG. 3 for clarity). This process may be repeated a number of times until the container 302 is near to the delivery location 120 of the recipient 118. Based on the transportation information 154, and further based on the container/location information 124 received from the container 302, the delivery module 144 can provide instructions to a courier 126 as to when vehicle carrying a particular container 302 will arrive at a location of a courier, and when the next public transport vehicle 156 will be arriving for the next handoff. For example, if there are a large number of public transport vehicles 156 traveling throughout a geographic region, and if most of these public transport vehicles 156 have one or more containers 112 on board on their way to various delivery locations, then the delivery module 144 will know the locations of these public transport vehicles 156 based on receiving container/location information 124 from the many containers 112, and will be able to accurately predict arrival times of the public transport vehicles at various destinations.

An Nth courier 126(N) may be selected by the delivery module 144 to receive the container 302 from the current courier 126 or from the receptacle 160 on whichever public transport vehicle 156 the container 302 is currently located, and deliver the container 302 the rest of the way to the delivery location 120. For example, the delivery module 144 may send container and/or location information 312 to the courier device 128(N) of the selected Nth courier 126(N) to inform the selected courier 126(N) where to pick up the container 302, and to further provide the delivery location 122 which to deliver the container 302.

When the Nth courier 126(N) has taken possession of the container 302, the courier application 132 may periodically send container/location information 314 to the delivery module 144 to keep the delivery module 144 apprised of the current location of the container 302. Throughout the transport of the container from the pickup location 116 to the delivery location 120, the delivery module 144 may provide container/location information 316 to the recipient device 136 of the recipient 118 to keep the recipient 118 apprised of the current location of the container 302. In some examples, the delivery module 144 may provide the selected couriers 126(1)-126(N) with contact information for contacting the recipient device 136 of the recipient 118 directly, such as to send the current location of the container 302 directly to the recipient device 136. The sender 110 may also receive the container/location information. Accordingly, the location of the container 302 may be determined by the recipient 118 and/or the sender 110 at essentially any point in time during transportation of the container 302 from the pickup location 116 to the delivery location 120.

After the Nth courier 126(N) retrieves the container 302 from the receptacle 160 on the public transport vehicle 156, the Nth courier may travel to the delivery location 120 to deliver the container 302. In some examples, such as in the case that the container 302 is recyclable, the empty container 302 may be taken by the Nth courier 126(N) at the completion of delivery and returned to a central repository or other receptacle. For instance, the courier 126(N) may place the empty container 302 back onto a public transport vehicle 156, and the empty container 302 may be subsequently retrieved from the public transport vehicle 156 by another courier 126 for reuse. In other examples, such as in the case in which the courier 126(N) leaves the container 302 at the door of a recipient 118 who is not currently at the delivery location 120, the empty container 302 may be picked up later by a courier 126, or the recipient 118 may reuse the empty container 302 to send a different item to a different recipient.

As another example, suppose that the item 114 is a commonly ordered item such as a food item, office-supply item, household item, or the like, for which the sender 110 may receive a many orders throughout the day. Accordingly, a plurality of the items 114 may be placed into each container 302 of a plurality of the containers 302 (not shown in FIG. 3). The first courier 126 may deliver the plurality of containers 302 to the second courier 126(2) on the public transport vehicle 156. Thus, each container 302 of the plurality of containers 302 may include a plurality of the items 114 contained therein which are available to be delivered as orders are received.

As the public transport vehicle 156 passes by selected areas of the geographic region from which a plurality of orders are predicted to be received or from which one or more orders may have already been received, the second courier 126(2) may receive instructions from the delivery module 144 to distribute the containers 302 to one or more couriers at particular areas of the geographic region. As the service provider 104 and/or the sender 110 receive orders for the items 114, the couriers 126 may already be in position to quickly deliver the items 114 as the orders are received. Accordingly, public transportation routes may be used to distribute a plurality of items 114 throughout a geographic region. In some cases, the items may be placed into position in for delivery before orders are received. For instance, the areas selected for positioning of couriers may be selected based on predictable patterns of previous orders placed by recipients having delivery locations in particular areas. Numerous other variations will be apparent to those of skill in the art having the benefit of the disclosure herein, with the foregoing being merely several examples for discussion purposes.

Figure 4:
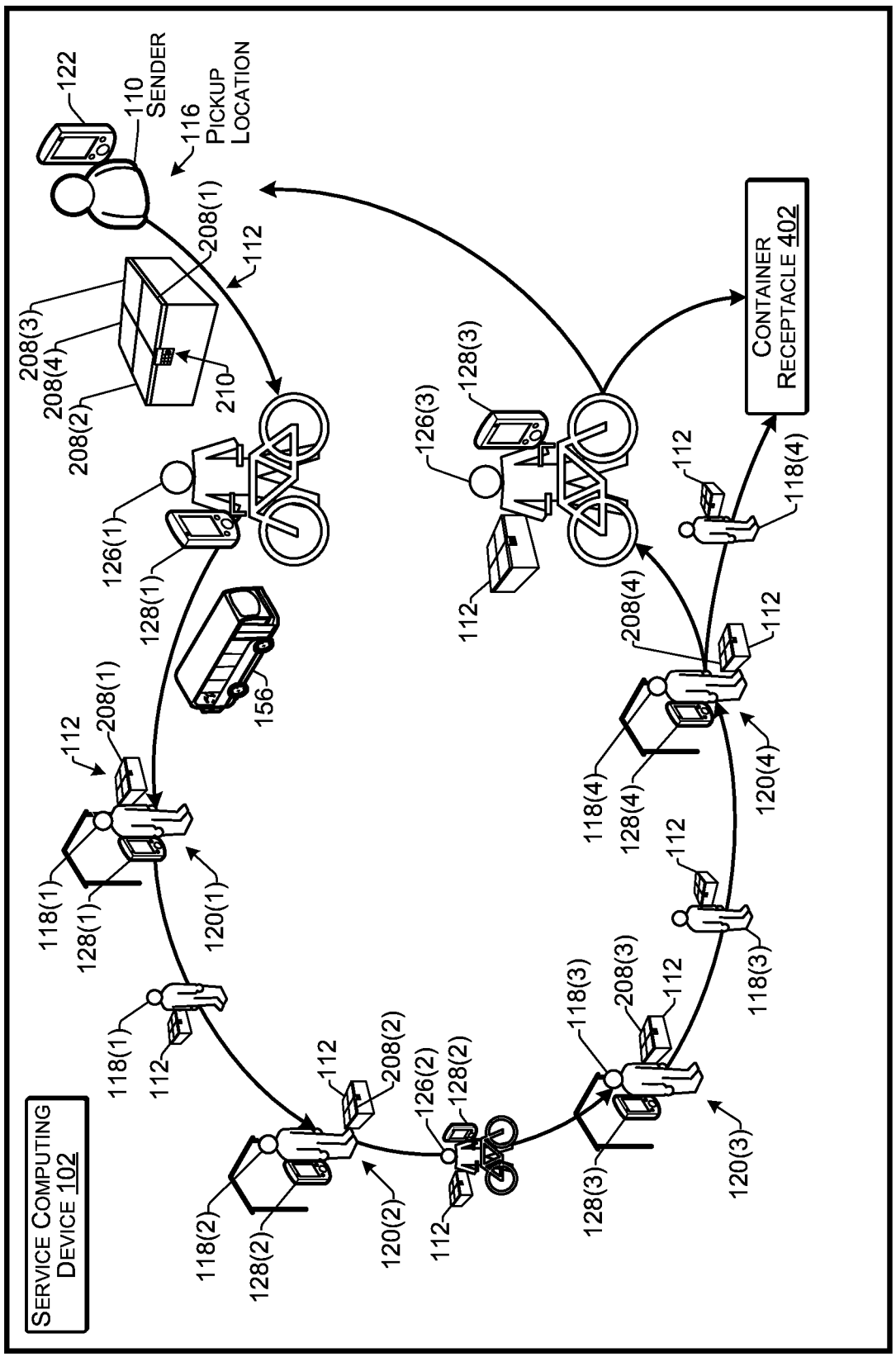
FIG. 4 illustrates an example system enabling crowdsourced and peer-to-peer deliveries according to some implementations.

FIG. 4 illustrates an example 400 of crowdsourced and peer-to-peer delivery according to some implementations. In this example, suppose that the container 112 includes four independently lockable closures 208(1)-208(4) for four respective compartments, and that each respective compartment includes a respective item (not shown in FIG. 4) intended for a different respective recipient 118(1)-118(4). For example, a first item in the compartment corresponding to closure 208(1) may be intended for the first recipient 118(1) at a first delivery location 120(1); a second item in the compartment corresponding to closure 208(2) may be intended for the second recipient 118(2) at a second delivery location 120(2); a third item in the compartment corresponding to the closure 208(3) may be intended for a third recipient 118(3) at a third delivery location 120(3); and a fourth item in the compartment corresponding to closure 208(4) may be intended for a fourth recipient 118(4) at a fourth delivery location 120.

Similar to the example of FIG. 1, the sender 110 may use the sender device 122 to send container and/or location information to the service computing device 102, or may cause the container 112 to send this information to the service computing device 102. In response, a first courier 126(1) may be assigned to pick up the container 112 from the pickup location 116. In some examples, the courier 126 may hand off the container 112 to a public transport vehicle 156 similar to the example discussed above with respect to FIG. 1. In other examples, if the first delivery location 120(1) is within a threshold travel time of the pickup location 116, the first courier 126(1) may deliver the container 112 directly to the first delivery location 120(1).

In either event, the first recipient may receive the container 112 at the first delivery location 120(1), and the first closure 208(1) may be opened to provide the first recipient 118(1) with the first item contained in the compartment corresponding to the first closure 208(1). For example, suppose that the courier 126 left the container 112 at the first delivery location 120(1). The service computing device 102 may offer the first recipient 118(1) the opportunity to receive an incentive, such as a reduced delivery fee or other compensation, if the first recipient 118(1) agrees to deliver the container 112 to the second recipient 118 at the second delivery location 120(2), such as within a threshold period of time. For instance, the service computing device 102 may send a communication to the recipient device 128(1) of the first recipient 118(1) to offer the incentive if the first recipient 118(1) will agree to deliver the container 112 to the second delivery location 120(2).

In some examples, the items packed into the container 112 may be selected so that the second delivery location 120(2) is within a threshold distance of the first delivery location 120(1) so that the first recipient 118(1) may be more likely to agree to deliver the container 112 to the second delivery location 120(2). In the illustrated example, suppose that the first recipient 118(1) agrees to deliver the container 112 to the second recipient 118(2) at the second delivery location 120(2). Furthermore, similar to the example discussed above with respect to FIG. 1, the container 112 may periodically continue to send location information to the service computing device 102, as well as to the sender 110 and/or the other recipients 118(2)-118(4). Consequently, if the first recipient does not deliver the container 112 to the second delivery location 120(2) within the threshold period of time, the service computing device may instruct a courier 126 to pick up the container 112 from the first delivery location 120(1) and deliver the container to the second delivery location 120(1).

When the first recipient delivers the container 112 to the second delivery location, the second closure 208(2) of the container 112 may be opened by the second recipient 118(2) using any of the techniques discussed above with respect to FIG. 1. Furthermore, suppose that the service computing device 102 offers the second recipient 118 incentive to deliver the container 112 to the third recipient 118(3) at the third delivery location 120(3). In the illustrated example, suppose that the second recipient 118(2) refuses to deliver the container 112 to the third recipient 118(3), or agrees, but does not deliver the container 112 within the threshold period of time. In either event, the service computing device 102 may assign a courier 126(2) to pick up the container 112 from the second delivery location 120(2) and deliver the container 112 to the third recipient 118(3) at the third delivery location 120(3).

After the container 112 is delivered to the third delivery location 120(3), the third closure 208(3) of the container 112 may be opened by the third recipient 118(3) using any of the techniques discussed above with respect to FIG. 1. Furthermore, suppose that the third recipient 118(3) agrees to deliver the container 112 to the fourth recipient 118(4) at the fourth delivery location 120(4), such as for an incentive offered by the service provider.

After the container 112 is delivered to the fourth delivery location 120(4), the fourth closure 208(4) of the container 112 may be opened by the fourth recipient 118(4) using any of the techniques discussed above with respect to FIG. 1. Furthermore, in some examples the service provider may offer the fourth recipient 118(4) an incentive to take the container to a container receptacle 402. As mentioned above, in some examples the container receptacle 402 may be a receptacle on a public transport vehicle 156. In other examples, the container receptacle 402 may be at a fixed location or facility for receiving containers 112, or the like. As still another alternative, if the fourth recipient 118(4) does not agree to return the container 112 within a threshold period of time, the service computing device 102 may assign a third courier 126(3) to pick up the container 112 from the fourth delivery location 120(4) and deliver the container 112 to the container return location 402. As still another alternative, the third courier 126(3) may pick up the container 112 from the fourth delivery location 120(4) while traveling to a pickup location 116 of a sender 110 to make a pickup of items for the container 112 or to pick up a different container 112. Accordingly, in the foregoing example, recipients 118 may essentially become couriers, while the location of the container 112 is known at all times, and the items contained in the container 112 remain secure and are delivered in a timely manner.

Figure 5:
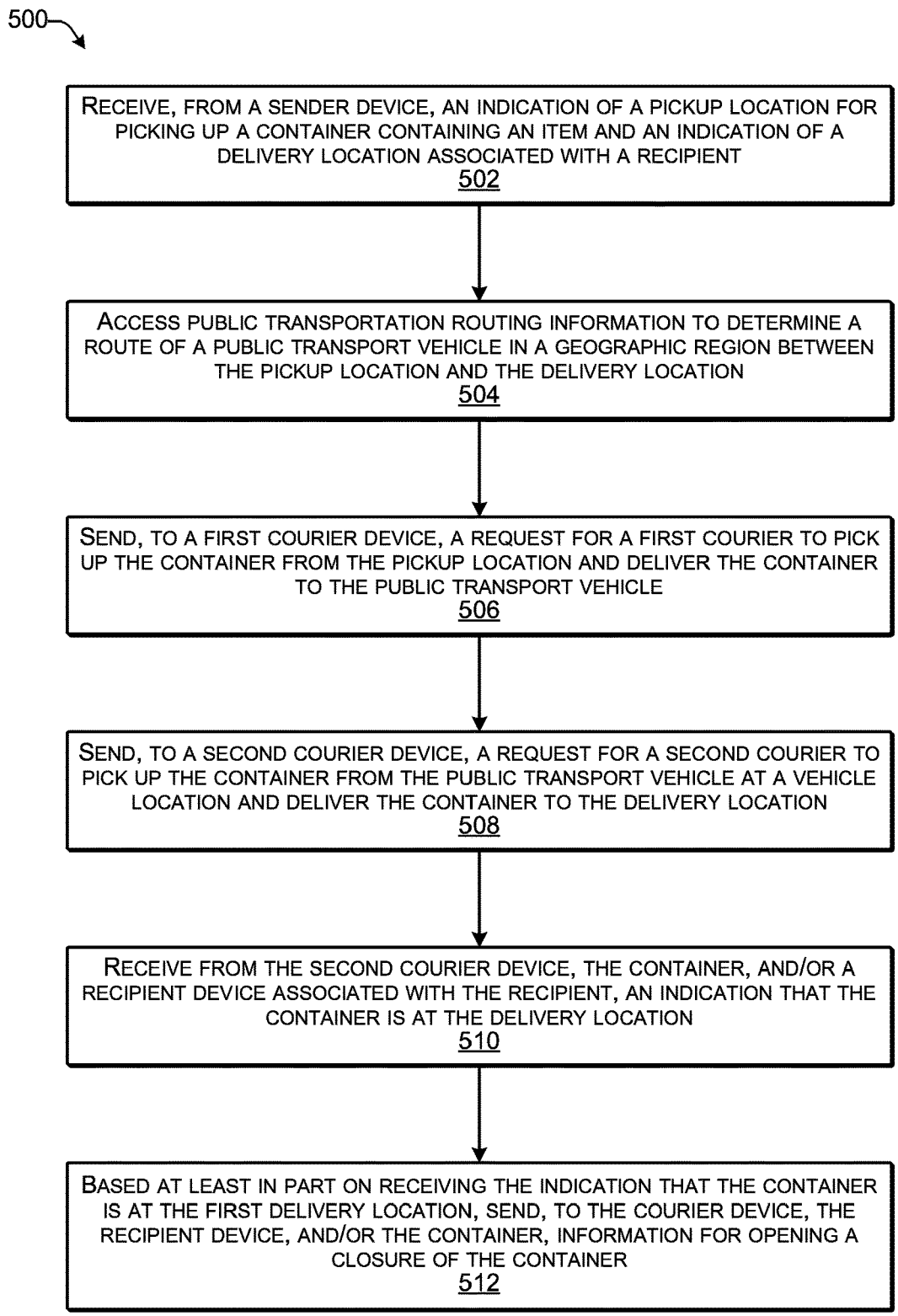
FIG. 5 is a flow diagram illustrating an example process for crowdsourced deliveries using a public transport vehicle according to some implementations.
Figure 6:
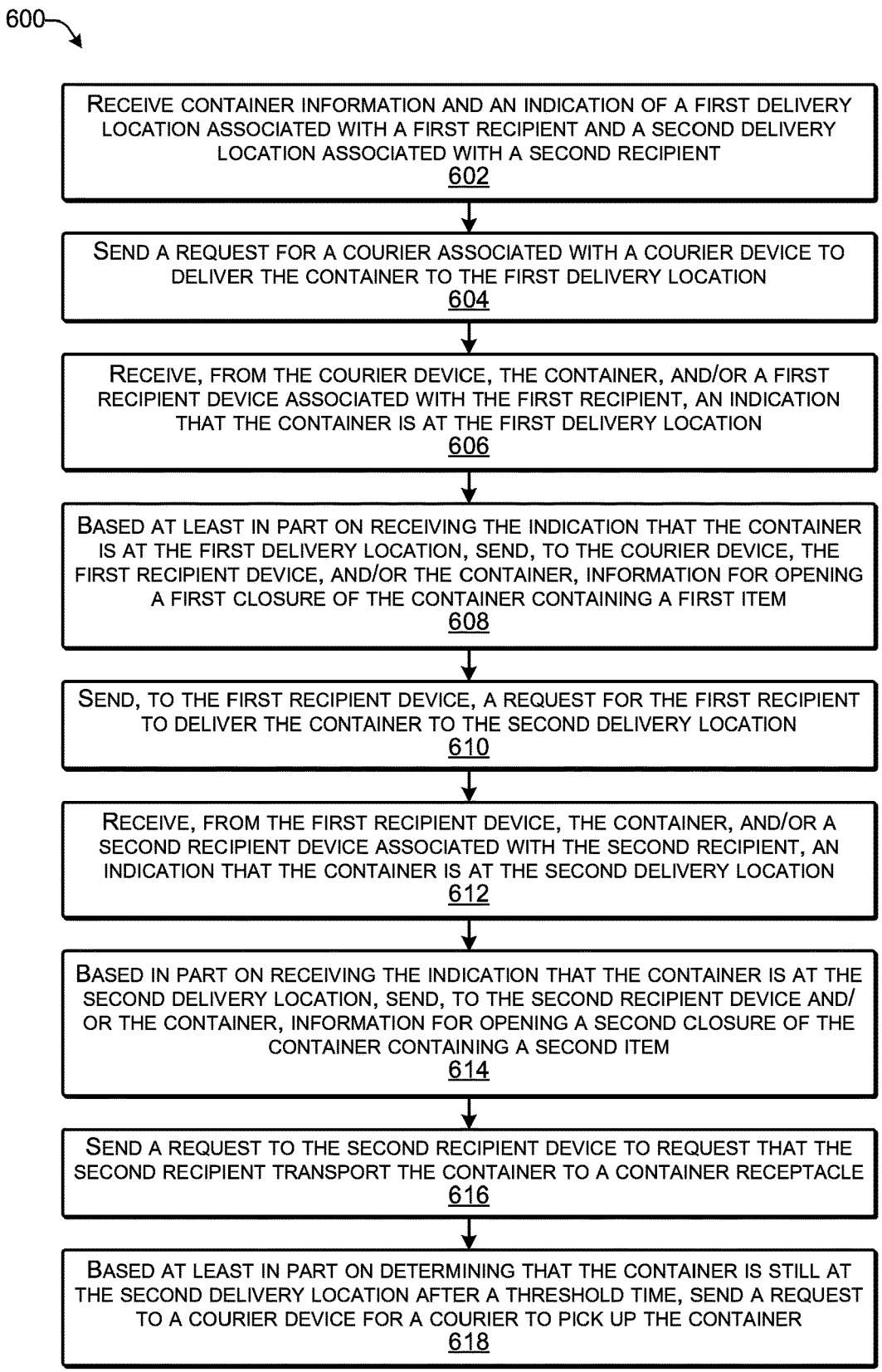
FIG. 6 is a flow diagram illustrating an example process for crowdsourced deliveries according to some implementations.
Figure 7:
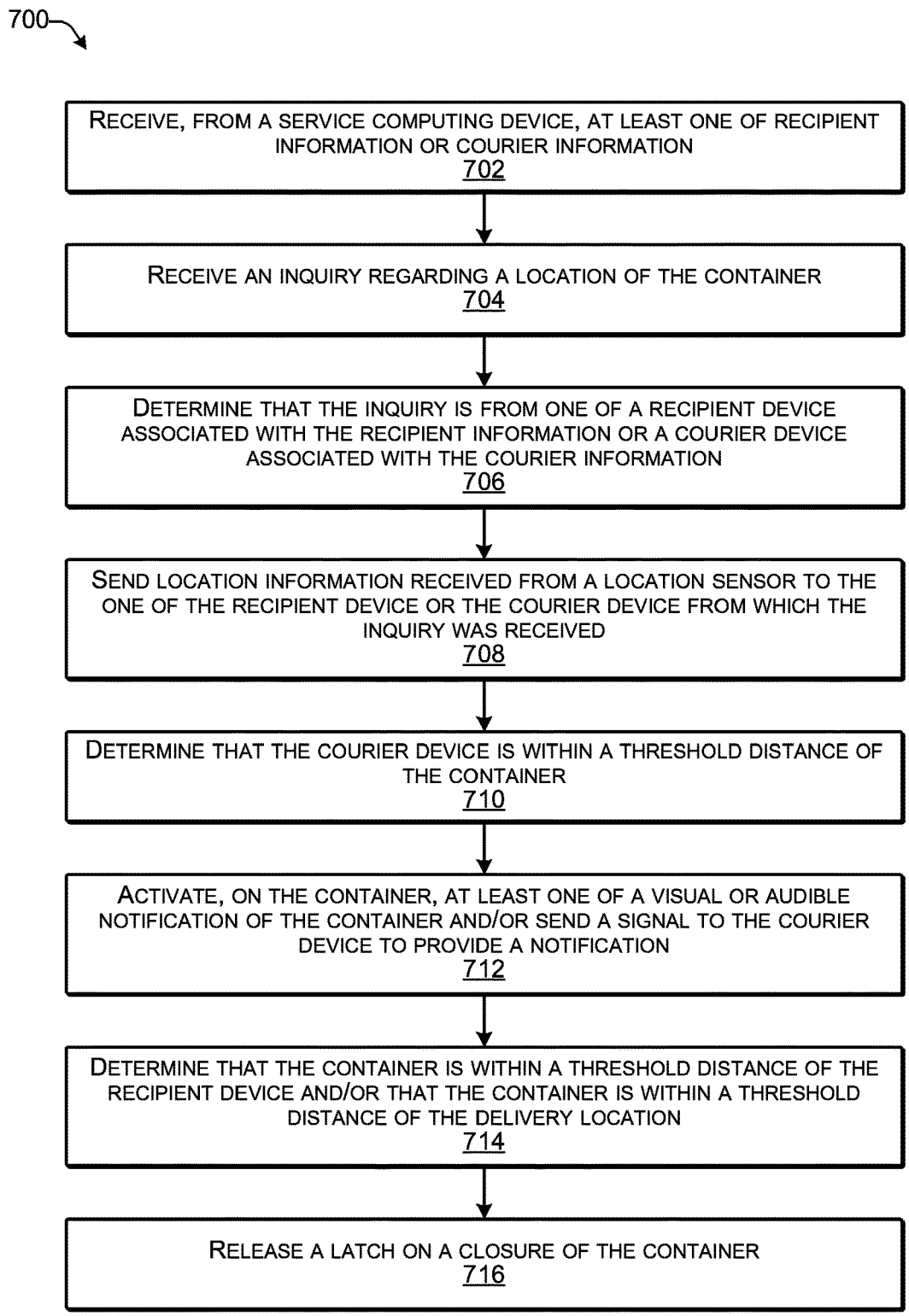
FIG. 7 is a flow diagram illustrating an example process for crowdsourced deliveries using a container according to some implementations.

FIGS. 5-7 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

FIG. 5 is a flow diagram illustrating an example process 500 for crowdsourced delivery using a public transport vehicle according to some implementations. In some examples, the process may be executed in part by the service computing device 102 or by another suitable computing device.

At 502, the computing device may receive, from a sender device, an indication of a pickup location for picking up a container containing an item and an indication of a delivery location associated with a recipient. In some examples, the container includes a first compartment containing a first item for deliver to a first recipient at a first delivery location, and a separately latched second compartment containing a second item for delivery to a second recipient at a second delivery location At 504, the computing device may access public transportation routing information to determine a route of a public transport vehicle in a geographic region between the pickup location and the delivery location. In some examples, a plurality of different public transport vehicles may be used.

At 506, the computing device may send, to a first courier device, a request for a first courier to pick up the container from the pickup location and deliver the container to the public transport vehicle. As one example, the first courier may t place the container into a receptacle on or in the public transport vehicle. As another example, the first courier may handoff the container to another courier who is riding on the public transport vehicle.

At 508, the computing device may send, to a second courier device, a request for a second courier to pick up the container from the public transport vehicle at a vehicle location and deliver the container to the delivery location. In the case that the container is in a locked receptacle on the public transport vehicle, the computing device may also send information to enable the second courier to open the receptacle.

At 510, the computing device may receive from the second courier device, the container, and/or a recipient device associated with the recipient, an indication that the container is at the delivery location.

At 512, based at least in part on receiving the indication that the container is at the first delivery location, the computing device may send, to the courier device, the recipient device, and/or the container, information for opening a closure of the container. In some examples, prior to sending the information to the courier device, the container, or the recipient device for opening the closure, the service computing device may perform at least one of: verifying receipt of payment for the first item via an account associated with the first recipient; receiving an indication from the container indicating that the first recipient device is within a threshold distance of the container; or receiving an indication from the first recipient device that the first recipient device is with the threshold distance of the container.

FIG. 6 is a flow diagram illustrating an example process 600 according to some implementations. In some examples, the process may be executed in part by the service computing device 102 or by another suitable computing device.

At 602, the computing device may receive container information, an indication of a first delivery location associated with a first recipient, and a second delivery location associated with a second recipient. For instance, a sender device may send the recipient information with pickup location information and an indication that the container is ready to be picked up.

At 604, the computing device may send a request for a courier associated with a courier device to deliver the container to the first delivery location. In some examples, the process 500 discussed above may performed, at least in part, for delivering the container to the first delivery location.

At 606, the computing device may receive, from the courier device, the container, and/or a first recipient device associated with the first recipient, an indication that the container is at the first delivery location.

At 608, based at least in part on receiving the indication that the container is at the first delivery location, the computing device may send, to the courier device, the first recipient device, and/or the container, information for opening a first closure of the container containing a first item. In some examples, prior to sending the information to the courier device, the container, or the first recipient device for opening the closure, the service computing device may perform at least one of: verifying receipt of payment for the first item via an account associated with the first recipient;

receiving an indication from the container indicating that the first recipient device is within a threshold distance of the container; or receiving an indication from the first recipient device that the first recipient device is with the threshold distance of the container.

At 610, the computing device may send, to the first recipient device, a request for the first recipient to deliver the container to the second delivery location. For example, the service provider may offer an incentive to the first recipient if the first recipient agrees to deliver the container to the second delivery location.

At 612, the computing device may receive, from the first recipient device, the container, and/or a second recipient device associated with the second recipient, an indication that the container is at the second delivery location.

At 614, based in part on receiving the indication that the container is at the second delivery location, the computing device may send, to the second recipient device and/or the container, information for opening a second closure of the container containing a second item.

At 616, the computing device may send a request to the second recipient device to request that the second recipient transport the container to a container receptacle. For example, the service provider may offer an incentive to the second recipient if the second recipient agrees to deliver the container to the container receptacle.

At 618, based at least in part on determining that the container is still at the second delivery location after a threshold time, the computing device may send a request to a courier device for a courier to pick up the container. For example, after the expiration of a threshold period of time, the service provider may decide to retrieve the container from the second recipient to reuse the container.

FIG. 7 is a flow diagram illustrating an example process 700 for crowdsourced delivers using a container according to some implementations. In some examples, the process 700 may be executed at least in part by the container 112.

At 702, the container may receive, from a service computing device, at least one of recipient information or courier information. For example, the service computing device may send recipient contact information and/or courier contact information to the container. Further, contact information for the container may be sent to the courier device and/or the recipient device by at least one of the service computing device or the container. In some examples, the container may receive, as the recipient information, first recipient information corresponding to a first item contained in a first compartment, and second recipient information corresponding to a second item contained in a second compartment of the container.

At 704, the container may receive an inquiry regarding a location of the container. For example, the recipient or the courier may send an inquiry to the container requesting a current location of the container.

At 706, the container may determine that the inquiry is from one of a recipient device associated with the recipient information or a courier device associated with the courier information. For example, based on the information received from the service computing device, the container may determine that the inquiry is from a device that is authorized to communicate with the container.

At 708, the container may send location information received from a location sensor to the one of the recipient device or the courier device from which the inquiry was received. For instance, the container may use an onboard GPS receiver to determine the current location of the container.

At 710, the container may determine that the courier device is within a threshold distance of the container. For example, the container and the courier device may communicate with each other to determine their relative locations.

At 712, the container may activate, on the container, at least one of a visual or audible notification of the container and/or send a signal to the courier device to provide a notification. When the courier device is within a threshold distance of the container, the container may flash its display, make a noise, or send a signal to the courier device to attract the attention of the courier so that the courier may more easily locate and pick up the container.

At 714, the container may determine that the container is within a threshold distance of the recipient device and/or that the container is within a threshold distance of the delivery location. For instance, the container may communicate with the recipient device, and may determine that the recipient device is within a threshold distance, e.g., within 0-10 feet of the container. Additionally, the container may determine, e.g., from the onboard GPS receiver that the container is indicated to be at the delivery location, such as within a GPS error tolerance.

At 716, the container may release a latch on a closure of the container. For example, based at least in part on receiving the indication that the container is at the delivery location and/or that the recipient device is near to the container, the service computing device may send to at least one of the courier device, the recipient device, or the container, information for opening a closure of a compartment of the container containing the item.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
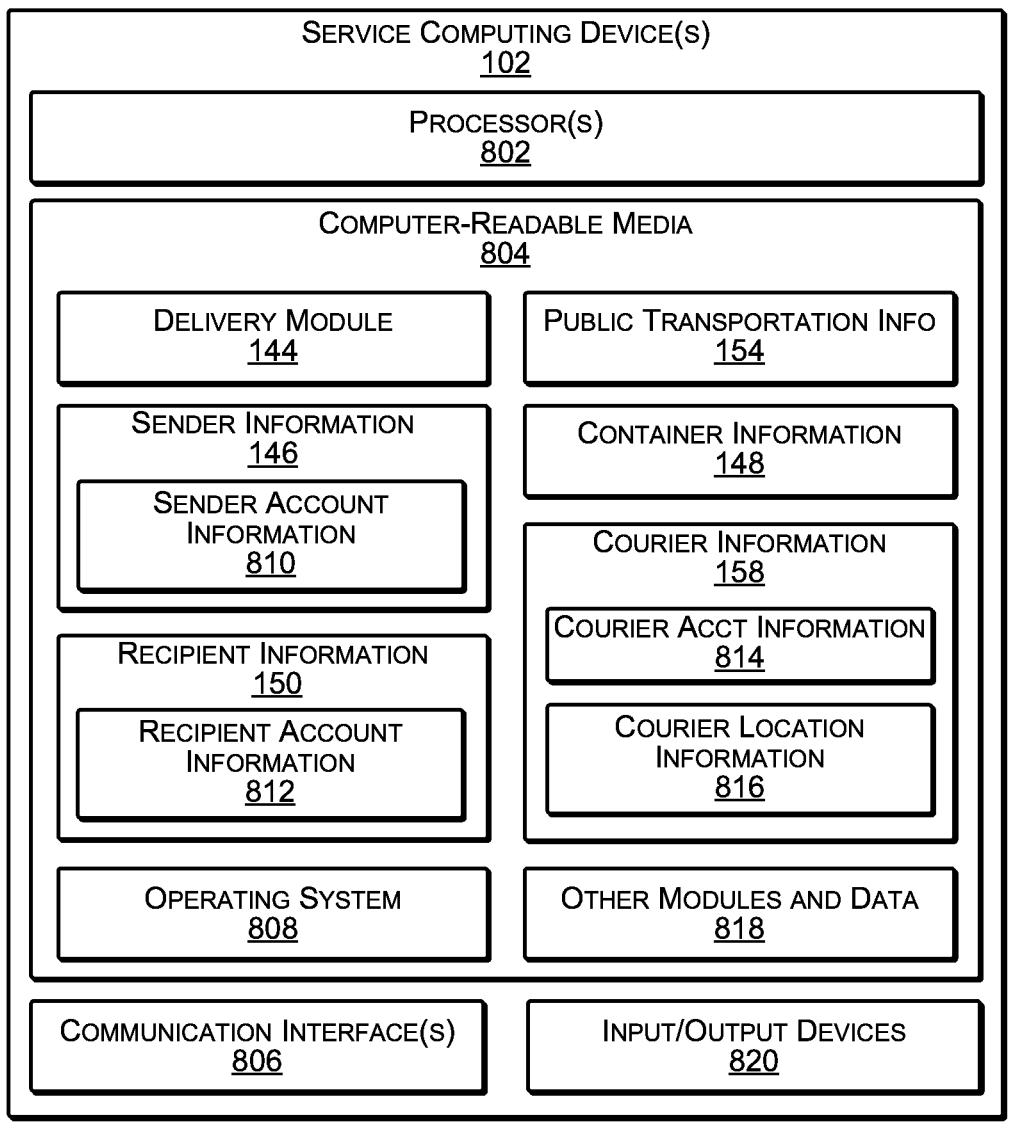
FIG. 8 illustrates select components of one or more example service computing devices according to some implementations.

FIG. 8 illustrates select components of the service computing device 102 that may be used to implement some functionality of the services described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 102 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuits, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 804 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 102. Functional components stored in the computer-readable media 804 may include the delivery module 144. Additional functional components stored in the computer-readable media 804 may include an operating system 808 for controlling and managing various functions of the service computing device 102.

In addition, the computer-readable media 804 may store data used for performing the operations described herein. Thus, the computer-readable media 804 may store: the public transportation information 154; the sender information 146, including sender account information 810; the container information 148; the recipient information 150, including recipient account information 812; and the courier information 158, including courier account information 146 and courier location information 132. The service computing device 102 may also include or maintain other functional components and data not specifically shown in FIG. 8, such as other modules and data 818, which may include programs, drivers, etc., and the data used or generated by the functional components. Further, the service computing device 102 may include many other logical, programmatic and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The service computing device 102 may further be equipped with various input/output (I/O) devices 820. Such I/O devices 820 may include a display, various user interface controls (e.g., buttons, joystick, keyboard, mouse, touch screen, etc.), audio speakers, connection ports and so forth.

Figure 9:
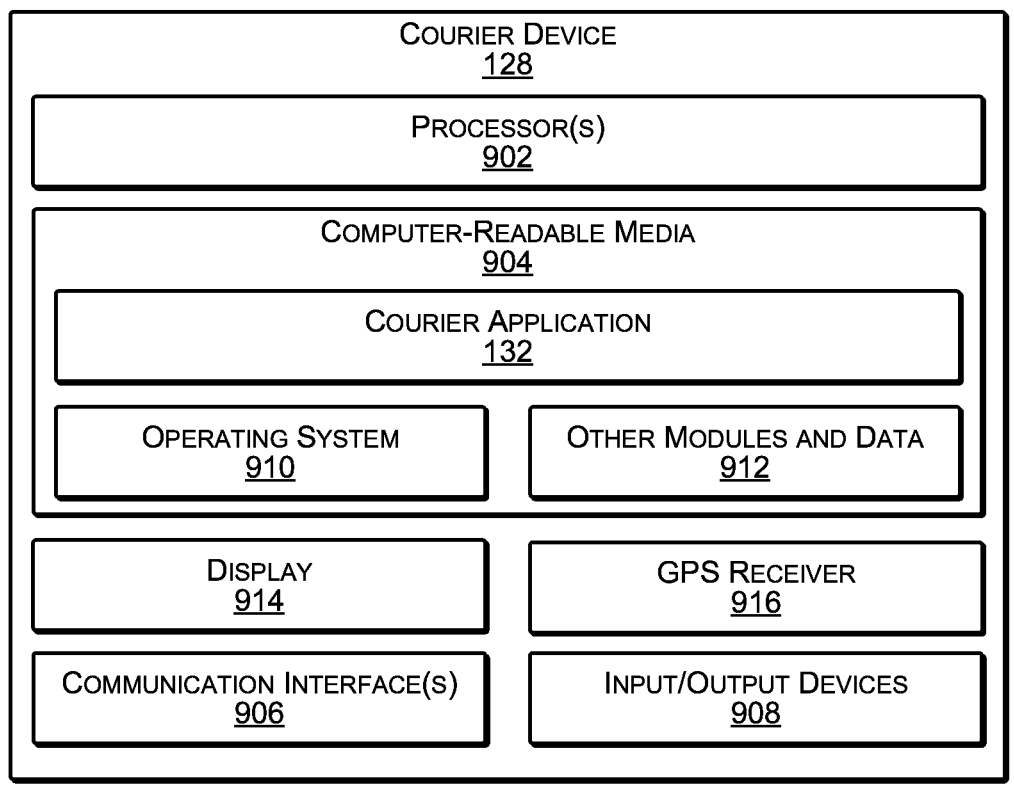
FIG. 9 illustrates select components of an example courier device according to some implementations.

FIG. 9 illustrates select example components of an example courier device 128 that may implement the functionality described above according to some implementations. The courier device 128 may be any of a number of different types of portable computing devices. Some examples of the courier device 128 may include smart phones and mobile communication devices; tablet computing devices; laptops, netbooks and other portable computers; wearable computing devices and/or body-mounted computing devices, which may include watches; augmented reality devices, such as helmets, goggles or glasses; and any other portable device capable of sending communications and performing the functions according to the techniques described herein.

In the example of FIG. 9, the courier device 128 includes components such as at least one processor 902, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuits, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the courier device 128, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 904 may include, but is not limited to, RAM, ROM, EEPROM, flash memory, solid-state storage, magnetic disk storage, optical storage, and/or other computer-readable media technology. Further, in some cases, the courier device 128 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules, or components that may be executed by the processor 902. Further, when mentioned herein, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the courier device 128. Functional components of the courier device 128 stored in the computer-readable media 904 may include the courier application 132, as discussed above, which may present the courier with one or more GUIs for performing the courier tasks. Additional functional components may include an operating system 910 for controlling and managing various functions of the courier device 128 and for enabling basic user interactions with the courier device 128.

In addition, the computer-readable media 904 may also store data, data structures and the like, that are used by the functional components. Depending on the type of the courier device 128, the computer-readable media 904 may also optionally include other functional components and data, such as other modules and data 912, which may include applications, programs, drivers, etc., and the data used or generated by the functional components. Further, the courier device 128 may include many other logical, programmatic, and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks (e.g., fiber optic, Ethernet), as well as close-range communications such as BLUETOOTH®, BLUETOOTH® low energy, and the like, as additionally enumerated elsewhere herein.

FIG. 9 further illustrates that the courier device 128 may include a display 914, which may be any suitable type of electronic display device for visually presenting information, GUIs, or the like. Alternatively, in some examples, the courier device 128 may not include a display.

The courier device 128 may further include the one or more I/O devices 908. The I/O devices 908 may include speakers, a microphone, a camera, and various user controls (e.g., buttons, a joystick, a keyboard, a keypad, etc.), a haptic output device, and so forth. Other components included in the courier device 128 may include various types of sensors, which may include a GPS receiver 916 able to receive and indicate location information, as well as other sensors (not shown) such as an accelerometer, gyroscope, compass, proximity sensor, and the like. In some cases, the GPS receiver 916 may be used by the courier application 132 to determine a current geographic location of the courier device 128. Additionally, or alternatively, the communication interfaces 906 may be used to determine the current location of the courier device 128, such as based on communication with nearby cell towers, wireless access points, and the like. In some examples, the courier application 132 may send this location information periodically to the service computing device as an indicated location of the associated courier. Additionally, or alternatively, the courier application 132 may send the location information whenever the accelerometer indicates a change in acceleration, e.g., beyond threshold amount, which may indicate starting movement or stopping movement by the courier. Furthermore, the courier device 128 may include various other components that are not shown, examples of which include removable storage, a power source, such as a battery and power control unit, and so forth. In some examples, the recipient devices 136 and the sender devices 122 may have configurations similar to the courier devices 128, but with different respective functional components, as discussed above.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
  a container including a plurality of compartments for containing a plurality of respective items during transport of the items from a sender to a plurality of respective recipients, the container including a container communication interface for communicating over one or more networks and a container GPS receiver;
  a plurality of recipient devices associated with the plurality of respective recipients, each recipient device including a respective recipient device processor and a respective recipient device communication interface coupled to the respective recipient device processor for communicating over the one or more networks;
  a plurality of courier devices associated with a plurality of respective couriers, each courier device including a respective courier device processor, a respective courier device GPS receiver coupled to the respective courier device processor, and a respective courier device communication interface coupled to the respective courier device processor for communicating over the one or more networks, each courier device programmed to determine, based at least in part on information from its respective courier device GPS receiver, a geographic location of the courier device;
  a sender device including a sender device processor and a sender device communication interface coupled to the sender device processor for communicating over the one or more networks; and
  a service computing device including a service computing device processor and a service computing device communication interface coupled to the service computing device processor for communicating over the one or more networks with the container, the plurality of recipient devices, the plurality of courier devices, and the sender device, the service computing device programmed to:

receive, by the service computing device, from the sender device, an indication of a pickup location, an indication of a first delivery location associated with a first recipient, an indication of a second delivery location associated with a second recipient, and an indication that the container, having a first item contained in a first compartment for delivery to the first recipient at the first delivery location and a second item contained in a second compartment for delivery to the second recipient at the second delivery location, is ready for pickup at the pickup location;

determine, by the service computing device, based on public transportation routing information, a route of a public transport vehicle in a geographic region between the pickup location and the first delivery location;

receive, by the service computing device, from the plurality of courier devices, indications of respective geographic locations of the plurality of courier devices;

send, by the service computing device, to a first courier device, based at least in part on the indicated geographic location of the first courier device, a request for a first courier associated with the first courier device to pick up the container from the pickup location and deliver the container to the public transport vehicle;

send, by the service computing device, to a second courier device, based at least in part on the indicated geographic location of the second courier device, a request for a second courier associated with the second courier device to pick up the container from the public transport vehicle at a vehicle location and deliver the container to the first delivery location;

send, by the service computing device, to the container, courier information to cause the container to send, based on the second courier device being within a threshold distance of the container, a signal to the second courier device, the signal providing a notification of the container on the second courier device;

receive, by the service computing device, a first plurality of communications from the container indicating locations of the container during transport of the container between the pickup location and the first delivery location;

receive, by the service computing device, from at least one of the second courier device, the container, or a first recipient device associated with the first recipient, an electronic communication indicating that the container is at the first delivery location;

send, by the service computing device, information to at least one of the second courier device, the container, or the first recipient device for opening a first closure of the first compartment containing the first item, wherein the first item is removed from the container and received by the first recipient;

send, by the service computing device, to the first recipient device, a request to deliver the container to the second delivery location within a threshold time in exchange for an incentive;

receive, by the service computing device, a second plurality of communications from the container indicating locations of the container during transport of the container from the first delivery location to the second delivery location;

receive, by the service computing device, from at least one of the first recipient device, the container, or a second recipient device associated with the second recipient, an electronic communication indicating that the first recipient delivered the container to the second delivery location; and send, by the service computing device, information to at least one of the container or the second recipient device for opening a second closure of the second compartment containing the second item, wherein the second item is removed from the container and received by the second recipient.

2. The system as recited in claim 1, wherein the public transport vehicle includes a receptacle for receiving the container, and the service computing device is further programmed to:

send to at least one of the first courier device or the second courier device, information for opening the receptacle on the public transport vehicle.

3. The system as recited in claim 1, wherein the service computing device is further programmed to:

send, to the container, contact information for at least one of the first courier device or the second courier device, wherein based at least in part on the contact information, the container is configured to communicate directly with the at least one of the first courier device or the second courier device to provide an indication of a location of the container.

4. The system as recited in claim 1, wherein, prior to sending the information to the at least one of the second courier device, the container, or the first recipient device for opening the first closure, the service computing device is further programmed to at least one of:

verify receipt of payment for the first item via an account associated with the first recipient;

receive an indication from the container indicating that the first recipient device is within a threshold distance of the container; or receive an indication from the first recipient device that the first recipient device is with the threshold distance of the container.

5. A method comprising:

receiving, by a computing device, an electronic communication including container information, wherein the container information relates to a container including a first compartment containing a first item for delivery to a first recipient at a first delivery location, and a second compartment containing a second item for delivery to a second recipient at a second delivery location;

sending, by the computing device, to a courier device, based at least in part on an indicated geographic location of the courier device, a request for a courier associated with the courier device to deliver the container to the first delivery location;

sending, by the computing device, to the container, courier information to cause the container to send, based on the second courier device being within a threshold distance of the container, a signal to the courier device to provide a notification of the container on the courier device to enable the courier to locate the container;

receiving, by the computing device, from at least one of the courier device, the container, or a first recipient device associated with the first recipient, an electronic communication indicating that the container is at the first delivery location;

sending, by the computing device, to the first recipient device, a request for the first recipient to deliver the container to the second delivery location; and receiving, by the computing device, from at least one of the first recipient device, the container, or a second recipient device associated with the second recipient, an electronic communication indicating that the first recipient delivered the container to the second delivery location where the second item is removed from the container and received by the second recipient.

6. The method as recited in claim 5, further comprising:

receiving, from a sender device, pickup location information, indicating a pickup location, and an indication of another item for delivery;

determining a previously used container able to be used for shipping the other item, wherein the previously used container is at a prior delivery location associated with a prior recipient; and sending, to a courier device associated with an available courier, a request to pick up the previously used container from the prior delivery location and transport the previously used container to the pickup location for transporting the other item.

7. The method as recited in claim 5, further comprising, based at least in part on receiving the indication that the container is at the first delivery location, sending, to at least one of the courier device, the first recipient device, or the container, information for opening a closure of the container.

8. The method as recited in claim 5, further comprising receiving a communication from the container to determine a location of the container at least one of before, during, or after transport of the container by the first recipient to the second delivery location.

9. The method as recited in claim 5, further comprising:

in response to receiving, from at least one of the first recipient device, the container, or the second recipient device associated with the second recipient, the electronic communication indicating the container is at the second delivery location, sending to at least one of the second recipient device or the container, information for opening a closure of the second compartment containing the second item.

10. One or more non-transitory computer-readable media maintaining instructions that, when executed by one or more processors, program the one or more processors to:

receive, by the one or more processors, an electronic communication including container information, an indication of a first delivery location associated with a first recipient, and a second delivery location associated with a second recipient, wherein the container information relates to a container including a first compartment containing a first item for delivery to the first recipient at the first delivery location and a second compartment containing a second item for delivery to the second recipient at the second delivery location;

send, by the one or more processors, to a courier device, based at least in part on an indicated geographic location of the courier device, a request for a courier associated with the courier device to deliver the container to the first delivery location;

send, by the one or more processors, to the container, courier information to cause the container to send, based on the courier device being within a threshold distance of the container, a signal to the courier device to provide a notification of the container on the courier device to enable the courier to locate the container;

receive, from at least one of the courier device, the container, or a first recipient device associated with the first recipient, an electronic communication indicating that the container is at the first delivery location;

send, to the first recipient device, a request for the first recipient to deliver the container to the second delivery location; and receive, from at least one of the first recipient device, the container, or a second recipient device associated with the second recipient, an electronic communication indicating that the first recipient delivered the container to the second delivery location.

11. The one or more non-transitory computer-readable media as recited in claim 10, wherein the instructions further program the one or more processors to:

based at least in part on receiving the electronic communication indicating that the container is at the first delivery location, send, to at least one of the courier device, the first recipient device, or the container, information for opening a first closure of the first compartment of the container containing the first item to enable the first item to be removed from the container and received by the first recipient.

12. The one or more non-transitory computer-readable media as recited in claim 11, wherein the instructions further program the one or more processors to:

based at least in part on receiving the electronic communication indicating that the container is at the second delivery location, send, to at least one of the second recipient device or the container, information for opening a second closure of the second compartment of the container containing the second item to enable the second item to be removed from the container and received by the second recipient.

13. The one or more non-transitory computer-readable media as recited in claim 10, wherein the instructions further program the one or more processors to:

send a request to the second recipient device to request that the second recipient transport the container to a container receptacle.

14. The one or more non-transitory computer-readable media as recited in claim 13, wherein the courier is a second courier, the courier device is a second courier device, and the instructions further program the one or more processors to:

access public transportation routing information to determine a route of a public transport vehicle in a geographic region between a pickup location associated with the sender and the first delivery location;

send, to a first courier device, based at least in part on an indicated geographic location of the first courier device, a request for a first courier associated with the first courier device to pick up the container from the pickup location and deliver the container to the public transport vehicle; and send, to the second courier device, based at least in part on an indicated geographic location of the second courier device, a request for the second courier associated with the second courier device to pick up the container from the public transport vehicle at a vehicle location and deliver the container to the first delivery location, wherein the container communicates with the second courier device, based on an indication that the second courier device is within a threshold distance of the container, by sending the signal to the second courier device, and further enables the second courier to locate the container by activating, on the container, at least one of a visual or audible notification of the container.

15. The one or more non-transitory computer-readable media as recited in claim 10, wherein the instructions further program the one or more processors to:
receive, from at least one of the container or the courier device, a plurality of communications indicating locations of the container while the container is being transported; and
send an indicated location of the container to at least one of the first recipient device or the second recipient device while the container is being transported.

16. A system comprising:
one or more processors; and
one or more non-transitory computer-readable media storing instructions that, when executed by the one or more processors, program the one or more processors to:
receive, by the one or more processors, an electronic communication including container information, an indication of a first delivery location associated with a first recipient, and a second delivery location associated with a second recipient, wherein the container information relates to a container including a first compartment containing a first item for delivery to the first recipient at the first delivery location and a second compartment containing a second item for delivery to the second recipient at the second delivery location;
send, by the one or more processors, to a courier device, based at least in part on an indicated geographic location of the courier device, a request for a courier associated with the courier device to deliver the container to the first delivery location;
send, by the one or more processors, to the container, courier information to cause the container to send, based on the courier device being within a threshold distance of the container, a signal to the courier device to provide a notification of the container on the courier device to enable the courier to locate the container;
receive, by the one or more processors, from at least one of the courier device, the container, or a first recipient device associated with the first recipient, an electronic communication indicating that the container is at the first delivery location;
send, by the one or more processors, to the first recipient device, a request for the first recipient to deliver the container to the second delivery location; and
receive, by the one or more processors, from at least one of the first recipient device, the container, or a second recipient device associated with the second recipient, an electronic communication indicating that the first recipient delivered the container to the second delivery location.

17. The system as recited in claim 16, wherein the instructions further program the one or more processors to:
based at least in part on receiving the electronic communication indicating that the container is at the first delivery location, send, to at least one of the courier device, the first recipient device, or the container, information for opening a first closure of the first compartment of the container containing the first item to enable the first item to be removed from the container and received by the first recipient.

18. The system as recited in claim 16, wherein the instructions further program the one or more processors to:
based at least in part on receiving the electronic communication indicating that the container is at the second delivery location, send, to at least one of the second recipient device or the container, information for opening a second closure of the second compartment of the container containing the second item to enable the second item to be removed from the container and received by the second recipient.

19. The system as recited in claim 16, wherein the instructions further program the one or more processors to:
send a request to the second recipient device to request that the second recipient transport the container to a container receptacle.

20. The system as recited in claim 16, wherein the courier is a second courier, the courier device is a second courier device, and the instructions further program the one or more processors to:
access public transportation routing information to determine a route of a public transport vehicle in a geographic region between a pickup location associated with the sender and the first delivery location;
send, to a first courier device, based at least in part on an indicated geographic location of the first courier device, a request for a first courier associated with the first courier device to pick up the container from the pickup location and deliver the container to the public transport vehicle; and
send, to the second courier device, based at least in part on an indicated geographic location of the second courier device, a request for the second courier associated with the second courier device to pick up the container from the public transport vehicle at a vehicle location and deliver the container to the first delivery location, wherein the container communicates with the second courier device based on an indication that the second courier device is within a threshold distance of the container, by sending the signal to the second courier device, and further enables the second courier to locate the container by activating, on the container, at least one of a visual or audible notification of the container.

21. The system as recited in claim 16, wherein the instructions further program the one or more processors to:
receive, from at least one of the container or the courier device, a plurality of communications indicating locations of the container while the container is being transported; and
send an indicated location of the container to at least one of the first recipient device or the second recipient device while the container is being transported.

* * * * *